US012668479B2

(12) United States Patent
Newton et al.

(10) Patent No.: US 12,668,479 B2
(45) Date of Patent: Jun. 30, 2026

(54) ULTRA HIGH RATIO LIQUID DELIVERY SYSTEM

(71) Applicants: John Newton, Vero Beach, FL (US); Jacob Lockwood, Vero Beach, FL (US); Michael Cheney, Vero Beach, FL (US); Dustin Hartsfield, Sebastian, FL (US); Rory Pawl, West Bloomfield, MI (US); Peter Brooke, Micco, FL (US); Gillian Callaghan, Vero Beach, FL (US)

(72) Inventors: John Newton, Vero Beach, FL (US); Jacob Lockwood, Vero Beach, FL (US); Michael Cheney, Vero Beach, FL (US); Dustin Hartsfield, Sebastian, FL (US); Rory Pawl, West Bloomfield, MI (US); Peter Brooke, Micco, FL (US); Gillian Callaghan, Vero Beach, FL (US)

(73) Assignee: GATE CFV SOLUTIONS, INC., Sebastian, FL (US)

( * ) Notice: Subject to any disclaimer, the term of this patent is extended or adjusted under 35 U.S.C. 154(b) by 725 days.

(21) Appl. No.: 17/382,693

(22) Filed: Jul. 22, 2021

(65) Prior Publication Data

US 2021/0347624 A1 Nov. 11, 2021

Related U.S. Application Data

(63) Continuation-in-part of application No. 16/854,040, filed on Apr. 21, 2020, now Pat. No. 11,104,567, (Continued)

(51) Int. Cl.
*B67D 1/00* (2006.01)
*B01F 23/451* (2022.01)
(Continued)

(52) U.S. Cl.
CPC .......... *B67D 1/0051* (2013.01); *B01F 23/451* (2022.01); *B01F 25/314* (2022.01); (Continued)

(58) Field of Classification Search
None
See application file for complete search history.

(56) References Cited

U.S. PATENT DOCUMENTS 7,814,931 B2 * 10/2010 Newton ............. G05D 16/0658 137/454.2
2008/0094935 A1 * 4/2008 Newton .............. A01M 7/0092 366/132

OTHER PUBLICATIONS

Article on Emco website discussing origins of dry break couplings back to 1950s: emcowheaton.com/en-tt/fuel-systems/dry-break-couplings (Year: 1950).*

* cited by examiner

*Primary Examiner* — Rita P Adhlakha
(74) *Attorney, Agent, or Firm* — CF3; Stephen Eisenmann

(57) ABSTRACT

A liquid dispensing system comprises a container enclosing a chamber. A flexible bag in the chamber contains a first liquid. First and second conduits are contained in the chamber. The first conduit connects the chamber to an outlet port in the container were the second conduit connects the bag to the first conduit. A supply source introduces a pressurized second liquid into the chamber. The first conduit serves to direct an exiting flow of the second liquid from the chamber to the outlet port, with the pressurized second liquid serving to collapse the bag and expel the first liquid contained therein via the second conduit to the first conduit for mixture with the exiting flow of the second liquid. The second conduit lacks flow restrictions, such as metering orifices or the like.

9 Claims, 20 Drawing Sheets

Related U.S. Application Data which is a continuation of application No. 16/244,581, filed on Jan. 10, 2019, now Pat. No. 10,654,701, which is a continuation of application No. 15/571,690, filed as application No. PCT/US2016/030950 on May 5, 2016, now Pat. No. 10,662,052.

(60) Provisional application No. 62/157,569, filed on May 6, 2015.

(51) Int. Cl.

| | |
|---|---|
| ***B01F 23/47*** | (2022.01) |
| ***B01F 25/314*** | (2022.01) |
| ***B01F 35/71*** | (2022.01) |
| ***B01F 101/14*** | (2022.01) |
| ***B67D 1/07*** | (2006.01) |
| ***B67D 7/02*** | (2010.01) |
| ***B67D 7/74*** | (2010.01) |

(52) U.S. Cl.

CPC ...... *B01F 25/3143* (2022.01); *B01F 35/7162* (2022.01); *B01F 35/71745* (2022.01); *B67D 1/0021* (2013.01); *B67D 1/004* (2013.01); *B67D 1/07* (2013.01); *B67D 7/0216* (2013.01); *B67D 7/0255* (2013.01); *B01F 23/471* (2022.01); *B01F 2101/14* (2022.01); *B67D 2001/075* (2013.01); *B67D 7/74* (2013.01); *B67D 2210/00163* (2013.01)

ULTRA HIGH RATIO LIQUID DELIVERY SYSTEM

REFERENCE TO RELATED APPLICATION

The present application claims priority to and is a continuation-in-part of U.S. patent application Ser. No. 16/854,040, entitled "Ultra High Ratio Liquid Delivery System", filed on Apr. 21, 2020 which claims priority to and is a continuation of U.S. patent application Ser. No. 16/244,581, entitled "Ultra High Ratio Liquid Delivery System", filed on Jan. 10, 2019 (Now U.S. Pat. No. 10,654,701), which claims priority to and is a continuation of U.S. patent application Ser. No. 15/571,690, entitled "Ultra High Ratio Liquid Delivery System", filed on Nov. 3, 2017 (Now U.S. Pat. No. 10,662,052) and is a National Stage Entry of PCT/US16/30950, entitled "Ultra High Ratio Liquid Delivery System", filed on May 5, 2016 which claims priority to Provisional Patent Application No. 62/157,569 filed May 6, 2015. All of the above-referenced patent applications are incorporated in their entirety by reference.

BACKGROUND DISCUSSION

U.S. Pat. No. 7,451,895 discloses a liquid dispensing system comprising a container containing at least one flexible bag. A first liquid is contained in the bag. A manifold chamber is in communication with the bag via a first metering orifice, and with the interior of the container via a second metering orifice. A second liquid is introduced under pressure into the container. The thus introduced second liquid serves to pressurize the first liquid in the bag, with the first and second metering orifices serving to respectively admit metered amounts of the first and second liquids into the manifold chamber for combination into a liquid mixture dispensed through an outlet. The metering orifices constrict flow and are prone to blockage when processing syrups and the like with elevated viscosities and/or high levels of suspended solids.

FIELD OF THE DISCLOSURE

This disclosure relates generally to liquid delivery systems, and is concerned in particular with a portable system capable of delivering an on demand high ratio mixture of at least two liquids, with at least one of the liquids having an elevated viscosity and/or a high level of suspended solids. Further, this disclosure illustrates a cleaning (e.g., cleaning, sanitizing, and/or rinsing) system for a drink dispensing device.

SUMMARY OF THE DISCLOSURE

In accordance with one aspect of the present disclosure, a liquid dispensing system comprises a container enclosing a chamber. A flexible bag in the chamber contains a first liquid. First and second conduits are located in the chamber. The first conduit connects the chamber to an outlet port in the container wall, and the second conduit connects the bag to the first conduit.

A supply source introduces a pressurized second liquid into the chamber. The first conduit serves to direct an exiting flow of the second liquid from the chamber to the outlet port, with the pressurized second liquid serving to collapse the bag and expel the first liquid contained therein via the second conduit to the first conduit for mixture with the exiting flow of the second liquid.

The first liquid may typically comprise a high viscosity beverage concentrate, and the second liquid may comprise municipal tap water.

The supply source of the liquid dispenser system may include a constant flow valve located externally of the container.

The liquid dispenser may further comprise check valves in one or both of the first and second conduits for preventing a reverse flow of liquid into the chamber.

The first conduit may include a metering orifice. However, the second conduit does not include any flow restriction devices such as metering orifices.

The first conduit may communicate with an upper region of the chamber, and the pressurized liquid may be introduced into a lower region of the chamber via an inlet port in the container.

A third open ended bypass conduit may be arranged between the container wall and the bag, and may extend from the lower region to the upper region of the chamber.

A liquid dispensing system in accordance with another aspect of the present disclosure may comprise a container enclosing a chamber having upper and lower region.

A flexible bag in the chamber extends vertically between the upper and lower regions.

A first liquid is contained in the bag, and first, second and third conduits are arranged in the chamber. The first conduit leads to an outlet port in the container wall. The second conduit connects the bag to the first conduit.

A supply source introduces a pressurized second liquid into the chamber and separately into the third conduit for delivery to the first conduit. The first conduit serves to direct an exiting flow of the second liquid to the outlet port, with the pressurized second liquid in the chamber serving to collapse the bag and expel the first liquid contained therein via the second conduit to the first conduit for mixture with the exiting flow of the second liquid.

The pressurized liquid may be introduced into a T-fitting in the chamber. The T-fitting has one branch communicating with the third conduit and another branch communicating with the chamber.

DETAILED DESCRIPTION

Figure 1:
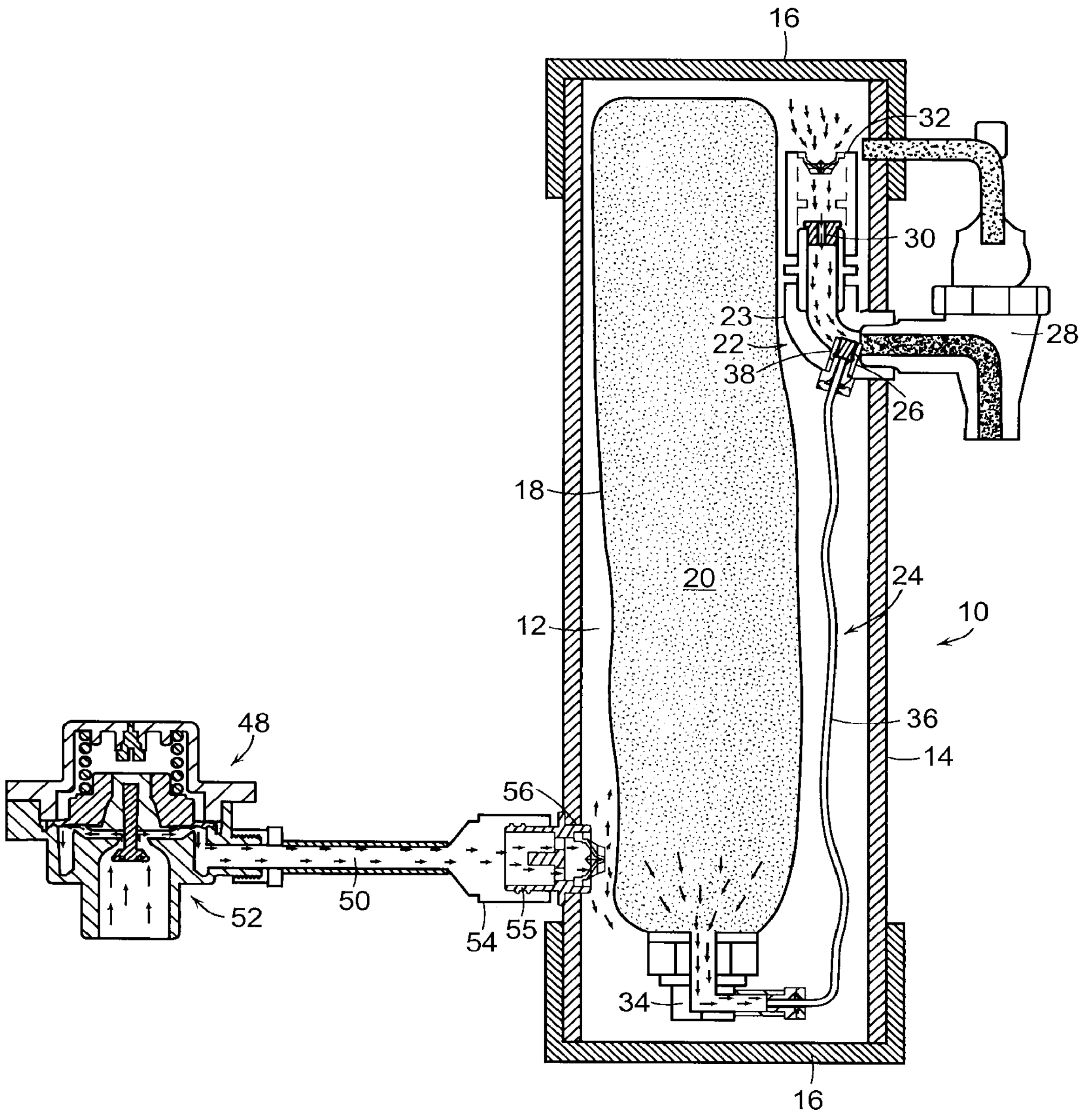
FIG. 1 is a diagrammatic illustration of an exemplary embodiment of a liquid delivery system in accordance with the present disclosure.

An exemplary embodiment of a liquid delivery system embodying aspects of the present disclosure is depicted in FIG. 1.

The system comprises a container 10 enclosing a chamber 12. The container may advantageously comprise a tubular wall 14 closed at its opposite ends by caps 16.

At least one flexible and collapsible bag 18 is contained in the chamber 12. The bag 18 typically will contain a first liquid 20, which may comprise a high viscosity beverage concentrate, for example a tea concentrate.

First and second conduits 22, 24 are located in the chamber 12. The first conduit 22 may typically include an elbow fitting 23, one end of which communicates with an outlet port 26 in the container wall 14. The outlet port 26 may lead to an on/off faucet 28 or other like dispenser. The dispenser may be manually operable, as shown, or of any known remotely operable type.

The first conduit 22 may additionally include an orifice 30 fitted to the opposite end of the elbow fitting 23, and a check valve 32. It will thus be seen that the first conduit 22, which as shown includes the elbow fitting 23, orifice 30 and check valve 32, provides a connection between the chamber 12 and the outlet port 26, which in turn communicates with the dispensing faucet 28.

The second conduit 24 may include an L-shaped fitting 34 closing the bottom open end of the bag 18, and a flexible tube 36 communicating at its opposite ends with the fitting 34 and the interior of the elbow fitting 23.

A check valve 38 may be included in the tube 36. The second conduit 24, which includes the fitting 34, tube 36 and check valve 38 thus connects the bag 18 to the first conduit 22, with such connection being achieved entirely within the confines of chamber 12.

Figure 2A:
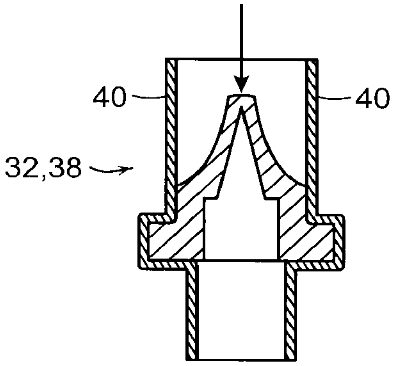
FIGS. 2A and 2B are illustrations depicting a typical check valve useful in the liquid delivery system of the present disclosure.
Figure 2B:
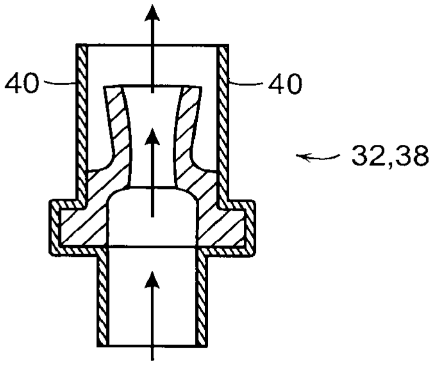

At least one and advantageously both of the check valves 32, 38 may comprise so called "duckbill valves", an exemplary embodiment of which is depicted in FIGS. 2A and 2B. Duckbill valves comprise one-piece elastomeric components that act as backflow prevention devices. They include elastomeric lips 40 in the shape of a duckbill which as shown in FIG. 2A, are closed by a backflow, and as shown in FIG. 2B, are opened by a forward flow. Although not shown, it is to be understood that other known check valves may be substituted for the disclosed duckbill valves.

Figure 3:
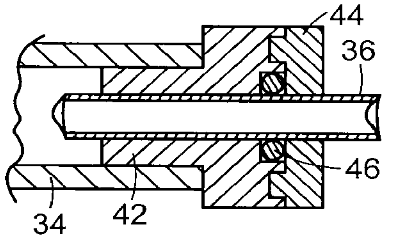
FIGS. 3 and 4 are enlarged views of portions of the system depicted in FIG. 1.

With reference to FIG. 3, it will be seen that the lower end of the flexible tube 36 is sealingly connected to the fitting 34 by means of an insert 42 coacting with cap 44 to compress an O-ring 46 around the tube. A similar arrangement may sealingly connect the upper end of the tube 36 to the elbow fitting 23.

The flexible tube 36 provides a smooth continuous connection between the fittings 34 and 23, without any internal restrictions of the type provided by metering orifices or the like.

A supply source 48 serves to introduce a pressurized second liquid 50 into the chamber 16. The second liquid may typically comprise tap water drawn from a municipal supply system.

Figure 4:
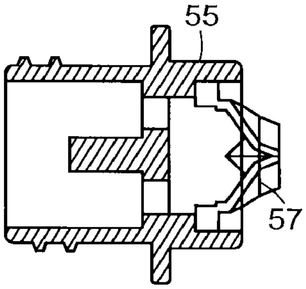

Advantageously, the supply source 48 may include a constant flow valve 52 connected by means of a dry break quick connect coupling 54 to a nipple 55 projecting from an inlet port 56 in the container wall 14. As can best be seen in FIG. 4, the nipple 55 may be provided with a duckbill check valve 57.

As herein employed, the term "constant flow valve" means a flow control valve of the type described, for example, in any one of U.S. Pat. Nos. 7,617,839; 6,026,850 or 6,209,578, the descriptions of which are herein incorporated by reference in their entirety. These types of valves are normally closed, are opened in response to pressures exceeding a lower threshold level, are operative at pressures between the lower threshold level and an upper threshold level to deliver liquids at a substantially constant pressures, and are again closed at pressures above the upper threshold level.

When the faucet 28 is opened, the first conduit 22 serves to direct an exiting flow of the pressurized second liquid 50 (water) from the chamber 12 through the outlet port 26. The pressurized second liquid in the chamber 12 also serves to collapse the bag 18, causing the first liquid 20 (beverage concentrate) to be expelled via the second conduit 24 for injection into the exiting flow of the second liquid in the elbow fitting 23 of the first conduit 22. Injection of the first liquid into the exiting flow of the second liquid resists layering of the first liquid and thereby promotes mixture of both liquids.

Figure 5:
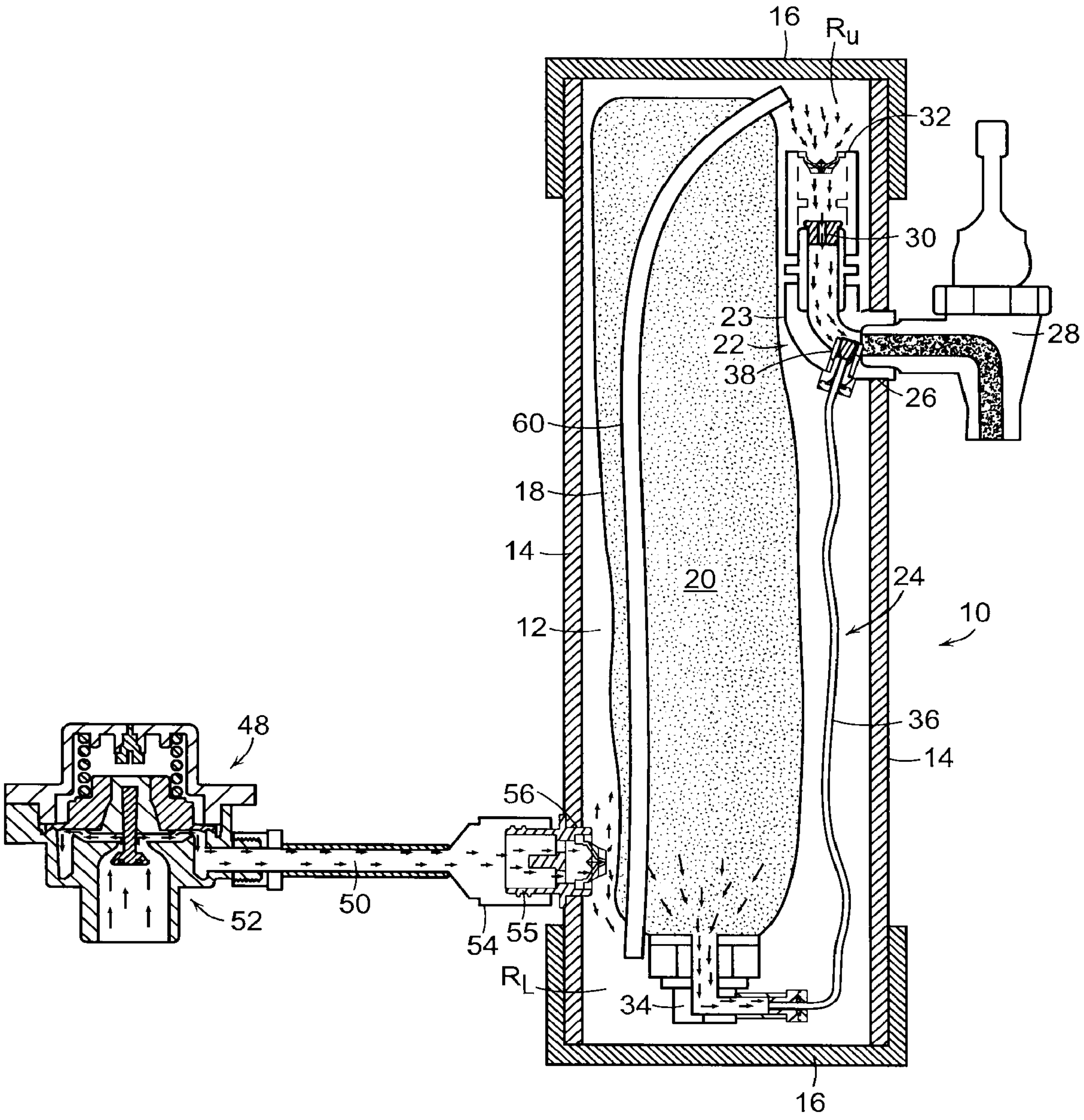
FIG. 5 is a diagrammatic illustration of a second exemplary embodiment of a liquid delivery system in accordance with the present disclosure.

In accordance with a second aspect of the present disclosure, and as depicted in FIG. 5, a third open ended bypass conduit. 60 is arranged between the interior of container wall 14 and the bag 18. Conduit 60 extends between upper and lower regions $R_U$, $R_L$ of the chamber 12. In the event that during usage of the system, the bag 18 should collapse against the container wall 14, the tube will continue to ensure delivery of the second liquid to the upper chamber $R_U$.

Figure 6:
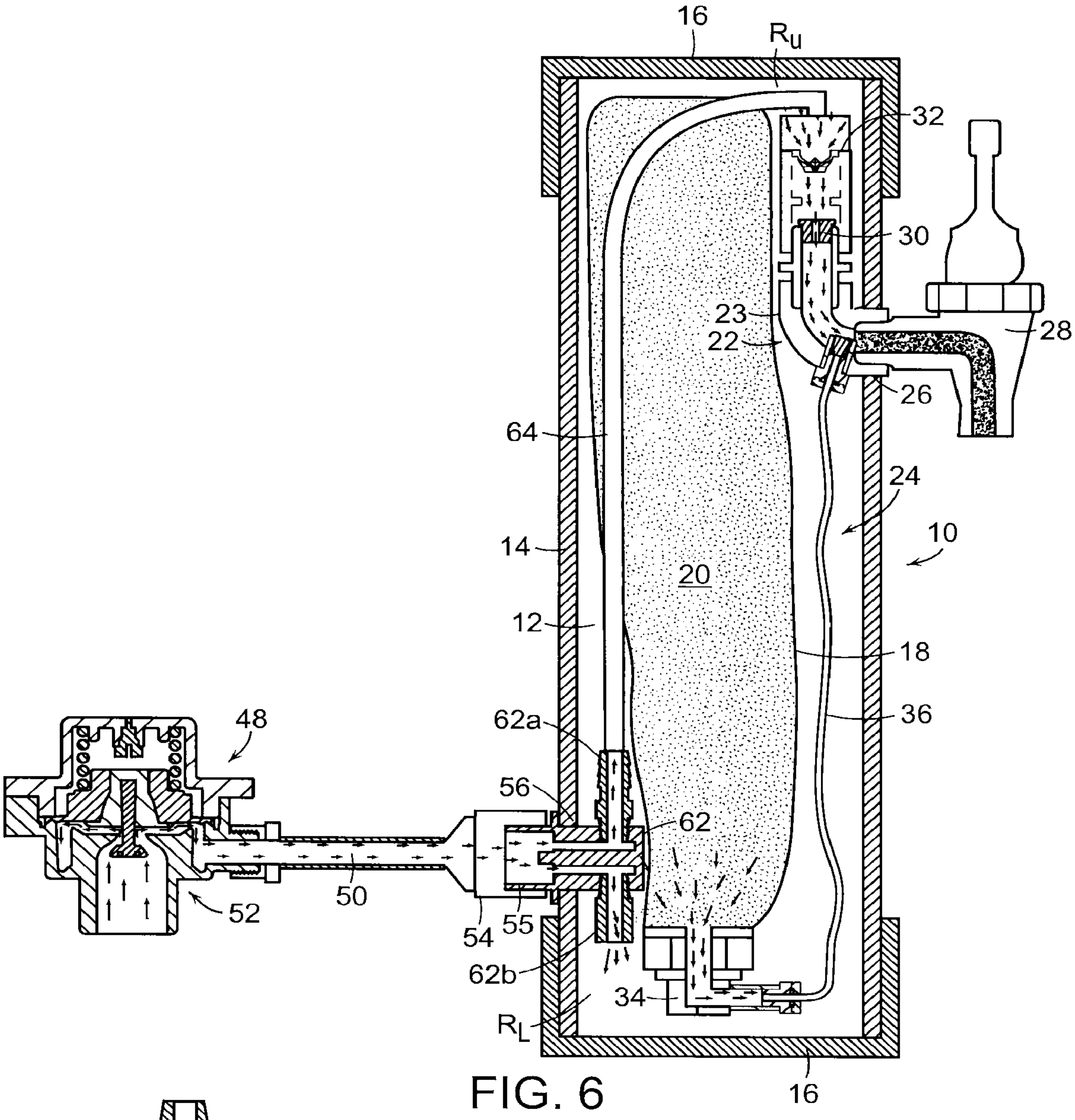
FIG. 6 is a diagrammatic illustration of a third exemplary embodiment of a liquid delivery system in accordance with the present disclosure.
Figure 7:
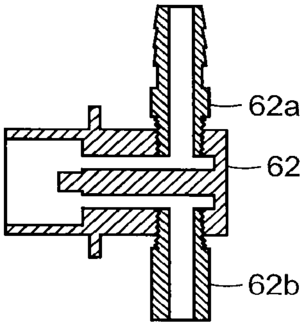
FIG. 7 is an enlarged view of the T-shaped fitting shown in FIG. 6.

In accordance with a third aspect of the present disclosure, as depicted in FIGS. 6 and 7, the second pressurized liquid 50 is introduced into a T-shaped fitting 62 located in the lower region $R_L$ of chamber 12. Fitting 62 has one branch 62*a* communicating with the lower end of a third conduit 64 and another branch 62*b* communicating with the lower region $R_L$ of chamber 12. The upper end of conduit 64 is connected directly to the first conduit 22 in the upper region $R_U$ of the chamber 12.

With this arrangement, the second liquid 50 is delivered to conduit 60 separately from that being delivered to the chamber 12.

Figure 8:
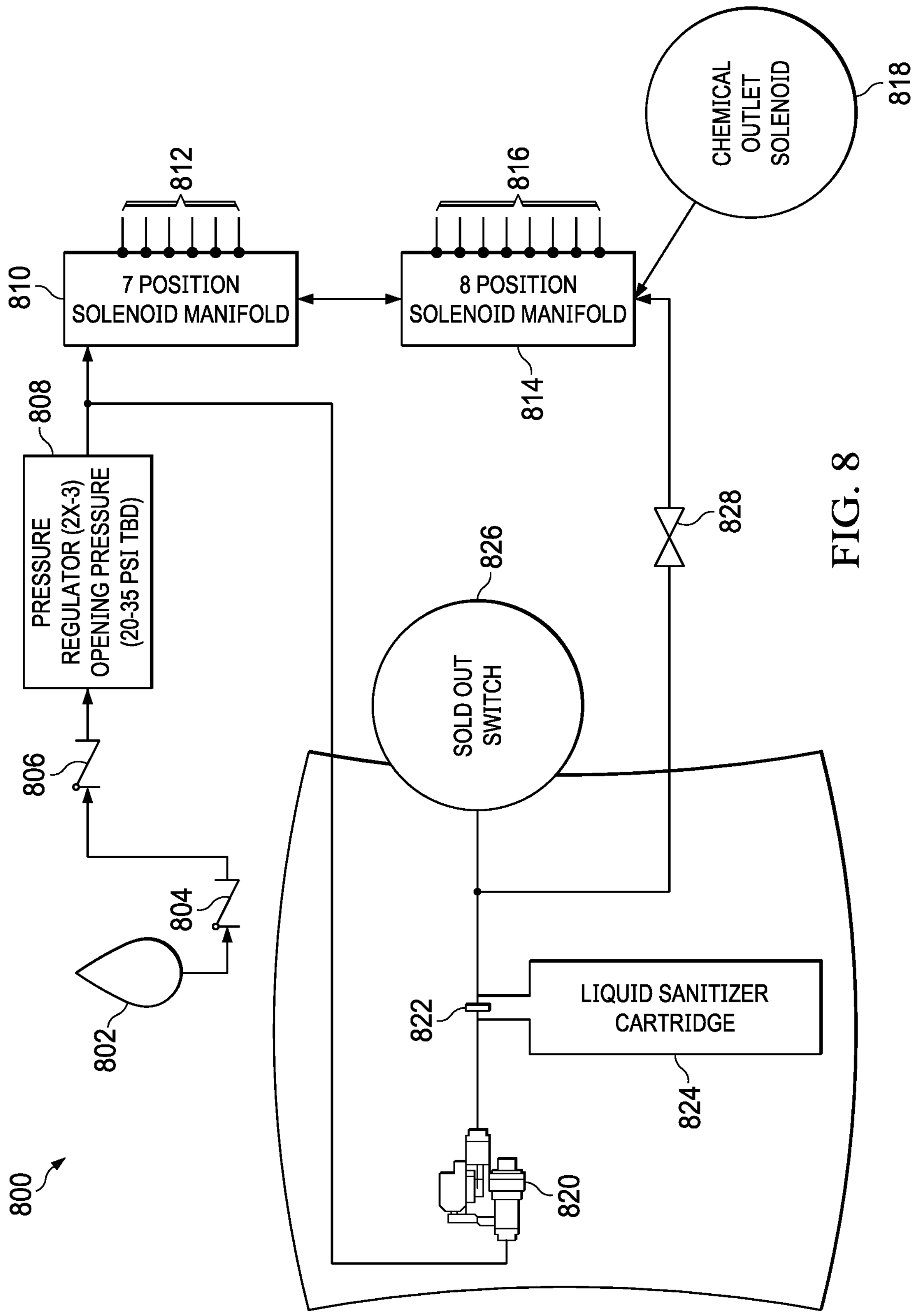
FIG. 8 is an illustration of a sanitation system, according to one embodiment.

In FIG. 8, an illustration of a sanitation system is shown, according to one embodiment. A sanitation system 800 may include a water source 802, a flow meter 804, a pressure transducer 806, a pressure regulator 808, a first solenoid 810 with 7 positions 812 (any number of positions could be utilized), a second solenoid 814 with 8 positions 816 (any number of positions could be utilized), a chemical outlet solenoid 818, a CFValve 820, a water orifice 822 (and/or any other orifice), a sanitizer cartridge 824 (and/or container and/or canister), a sold out switch 826, and/or a check valve 828. In various examples, the pressure regulator is a 2×-3 regulator. In various examples, the opening pressure is between 20-35 PSI. In one example, the ratio is 375 to 1 and 0.5 min, 2 gallon target. In another example, the ratio is 525 to 1 and 0.5 minute, 2 gallon target. In various other examples, the ratio could be anywhere between 375-525 to 1 and a target of 1 gallon to 3 gallons per 0.5 minutes. In another example, the sold out switch 826 is initiated based on the sanitizer cartridge being empty. For example, a ratio may be water to concentrate—1 part of concentrate to 300 parts of water.

Figure 9:
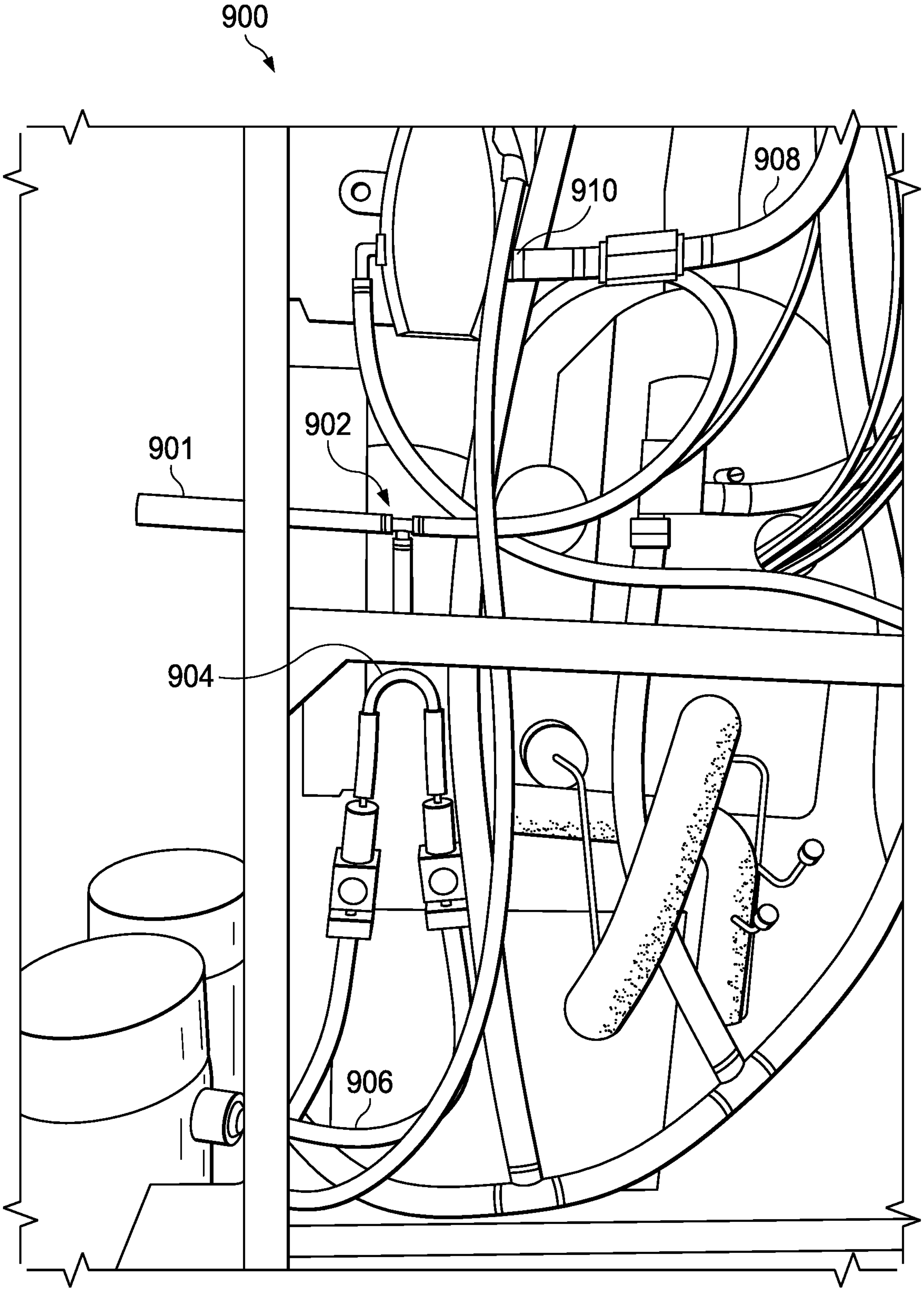
FIG. 9 is another illustration of a sanitation system, according to one embodiment.

In FIG. 9, another illustration of a sanitation system is shown, according to one embodiment. A sanitation system 900 may include an water inlet 901, a water inlet tee 902, a Y water connection to CFives 904 (and/or one to sanitizer and/or one to cleaner), a mixed diluted sanitizer and cleaner outlet 906, a total dissolved solids meter 908 (and/or a flow meter and/or a temperature sensor), a mixed diluted sanitizer and cleaner outlet 910. In one example, there could be two lines where 1 would be dedicated for the sanitizer and 1 would be dedicated for the cleaner. In another example, the mixed diluted sanitizer and cleaner outlet 910 would connect to two check valves going to the Mac Valve Block. Further, to integrate a water wash down circuit and a manual pump circuit a manifold connection leading to the Mac Valve Block could be utilized. In one example of field retrofit, a hole would be needed to be cut in the rear panel to allow for out/in tubing. This could also be accomplished by replacing the rear panel. Further, a T and check valves may be placed on water inlet to Y fitting to CFives (e.g., CFValves). In addition, 2 tubes out of CFives with dry break to back of UHR cartridge may be utilized. Further, 2 tubes out of cartridge (dry break) into machine could be used which could be connected via check valves into Y fitting into cleaning line. Further, the locations of the CFives can be moved if needed.

Figure 10:
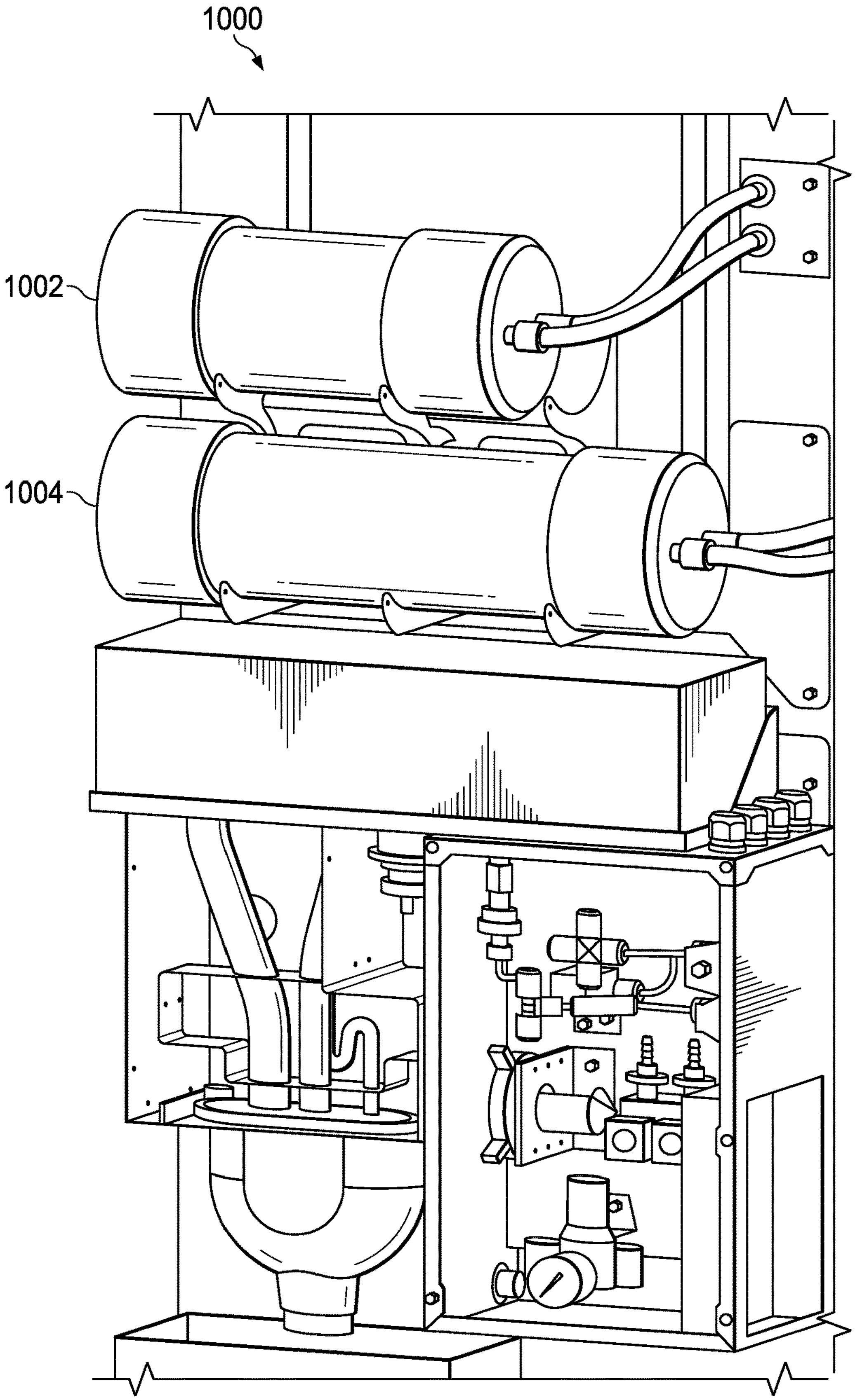
FIG. 10 is another illustration of a sanitation system, according to one embodiment.

In FIG. 10, another illustration of a sanitation system is shown, according to one embodiment. A sanitation system 1000 may include a first canister 1002 (e.g., a sanitizer canister), a second canister 1004 (e.g., a cleaning canister), and an Nth canister (e.g., anything in this disclosure) (not shown). The first canister 1002, the second canister 1004, and/or the Nth canister may be coupled to the drink dispensing system to allow water, sanitizer, and cleaning solutions to clean, sanitizes, and rinse any part of the drink dispensing system (see FIGS. 11-22).

Figure 11:
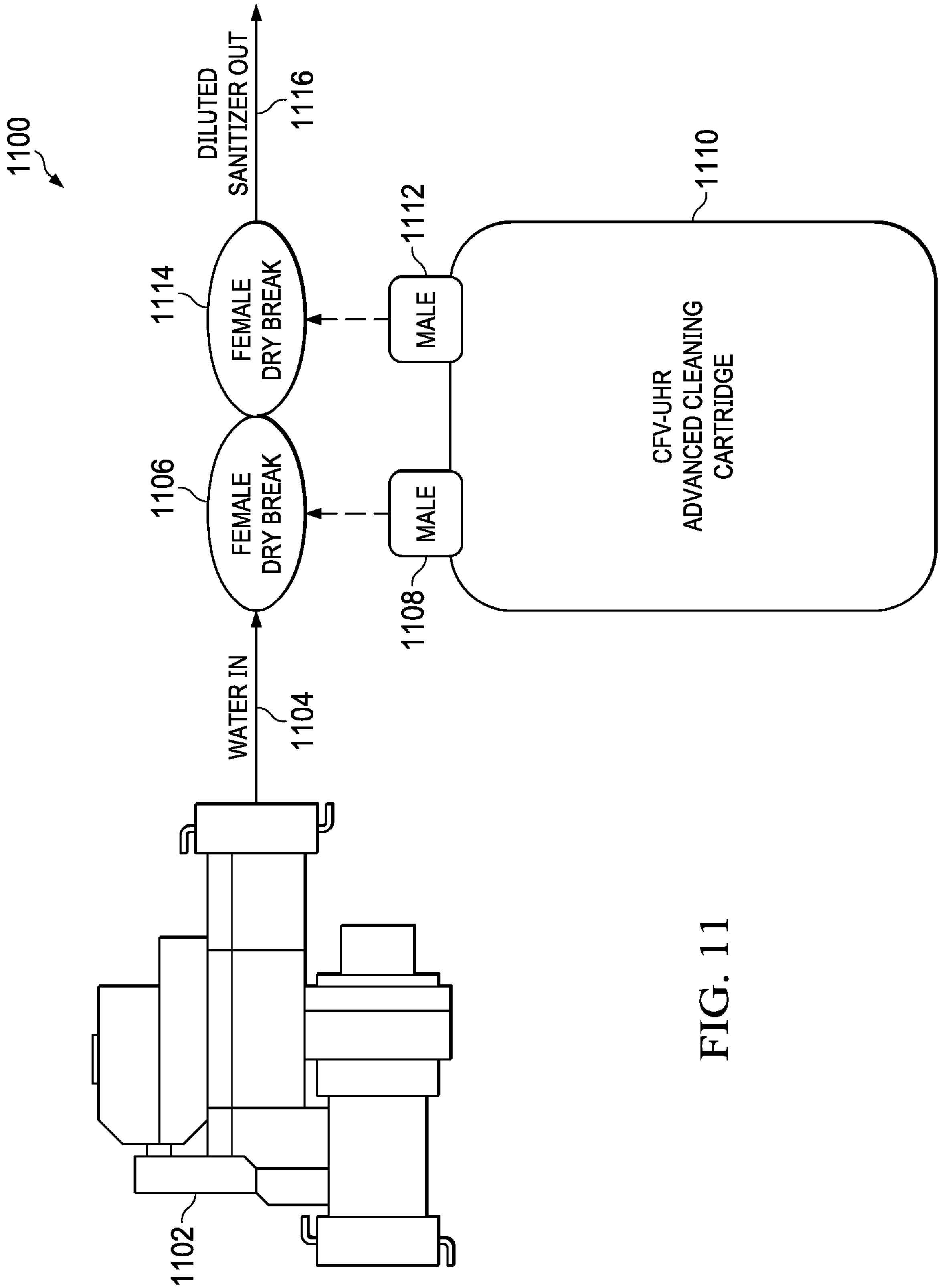
FIG. 11 is an illustration of a bag-in-bottle sanitation system, according to one embodiment.

In FIG. 11, an illustration of a bag-in-bottle sanitation system is shown, according to one embodiment. A sanitization system 1100 may include a CFValve 1102 (e.g., CFives) which provides a water in flow 1104 to a first female dry break 1106 which is coupled to a first male counterpart 1108 on the cartridge 1110 (e.g., cleaning, sanitizer, etc.) which is coupled to a second male counterpart 1112 which is coupled to a second female dry break 1114 which produces a diluted solution (e.g., cleaning, sanitizer, etc.). This cartridge system can be utilized with any other system disclosed in this document.

Figure 12B:
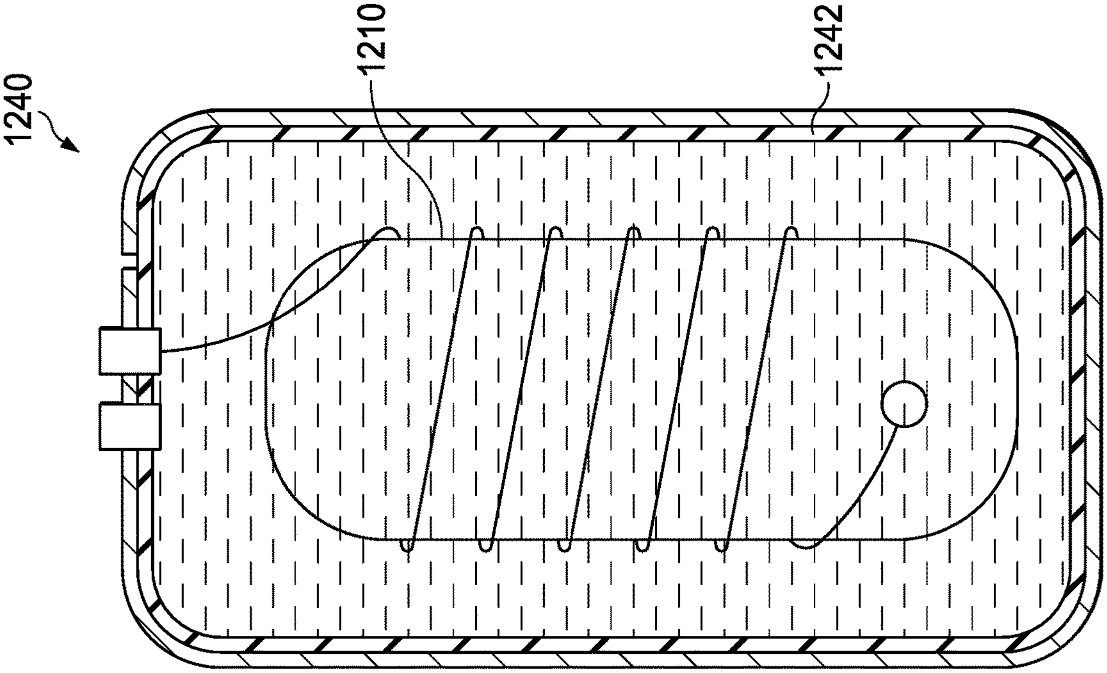
FIG. 12B is another illustration of a bag-in-bottle sanitation system, according to another embodiment.
Figure 12A:
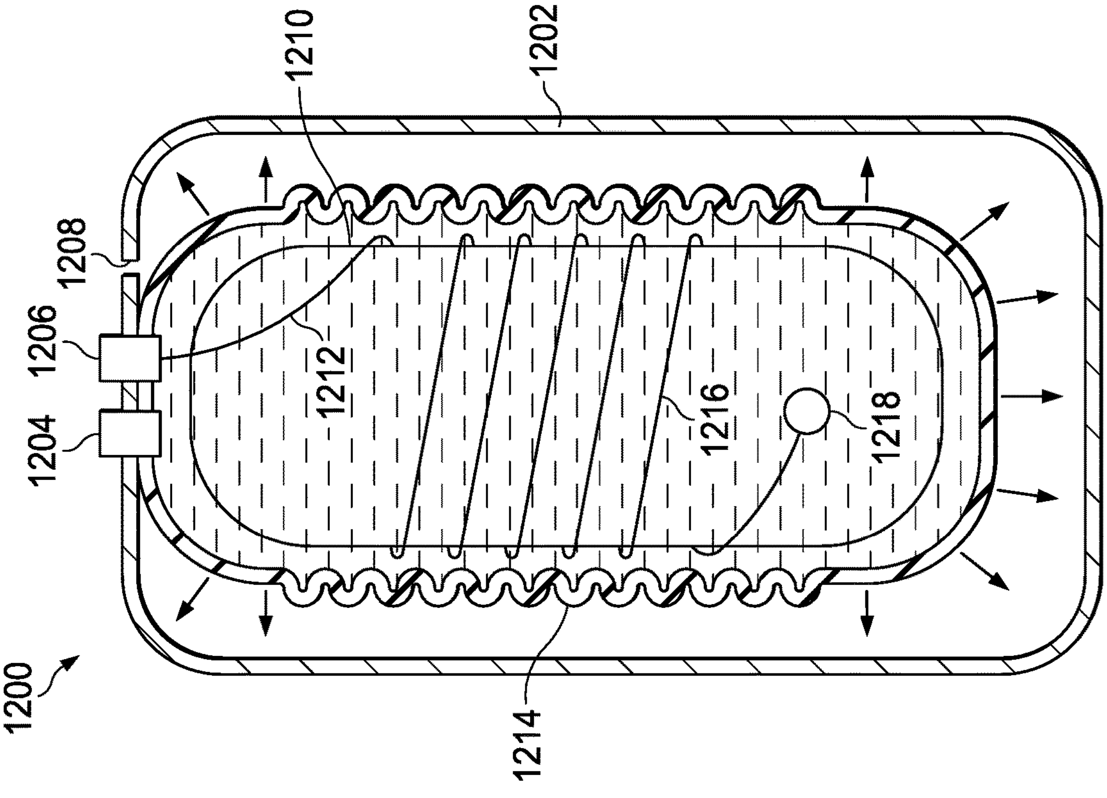
FIG. 12A is another illustration of a bag-in-bottle sanitation system, according to another embodiment.

In FIG. 12A, another illustration of a bag-in-bottle sanitation system is shown, according to another embodiment. A sanitation system 1200 may include a bag-in-bottle device 1202 which may include an inlet 1204, an outlet 1206, a vent 1208, a bag 1210, a tube orifice 1212, and/or an anchor 1218. In one example, the outer bag is in a collapsed state 1214 and the tube orifice is in a collapsed bag position 1216. In FIG. 12B, another illustration of a bag-in-bottle sanitation system is shown, according to another embodiment. A sanitation system 1240 may include a bag-in-bottle device 1240 in an outer bag expanded state to file container 1242.

Figure 13:
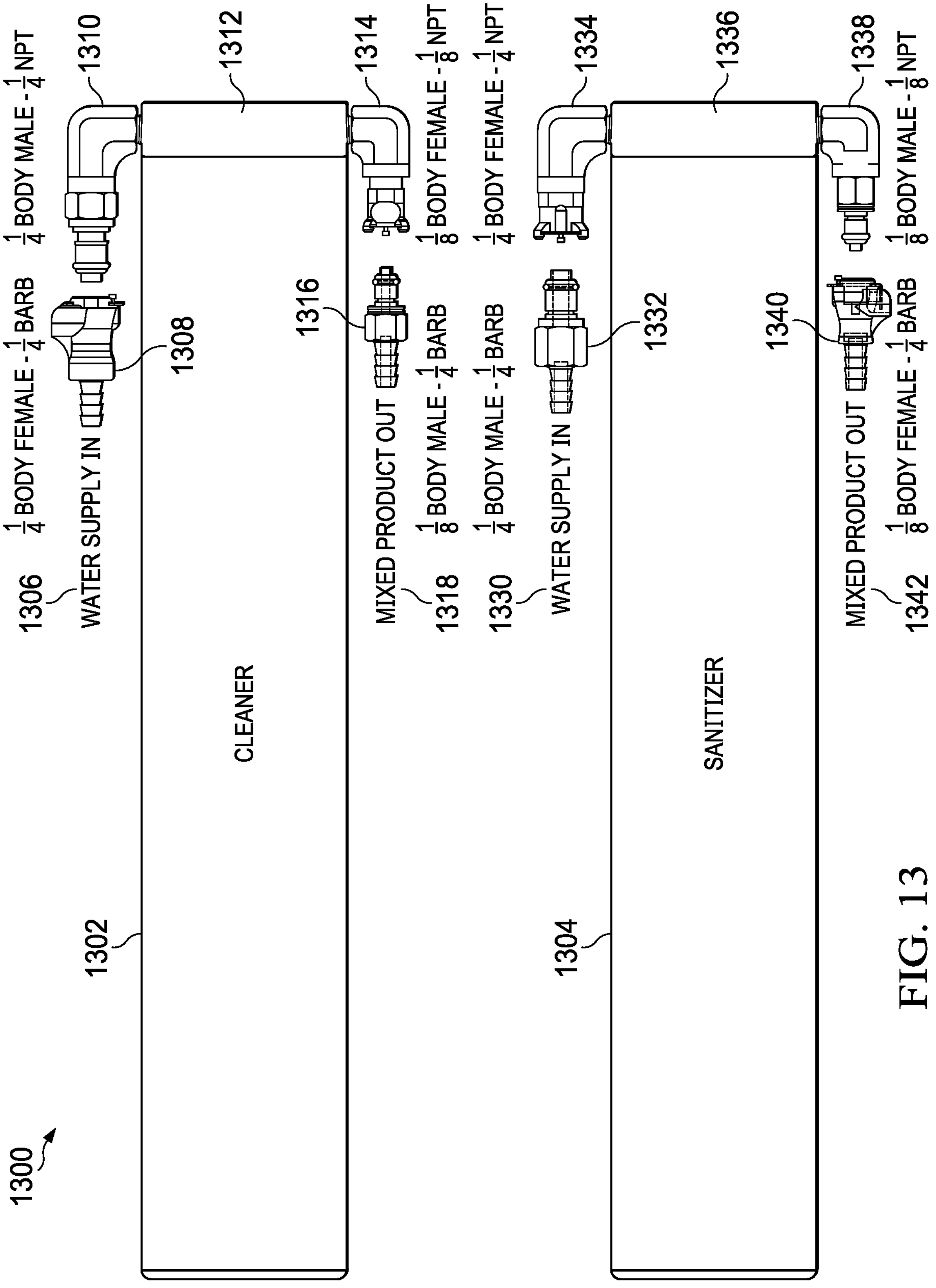
FIG. 13 is an illustration of a sanitation system, according to one embodiment.

In FIG. 13, an illustration of a sanitation system is shown, according to one embodiment. A sanitation system 1300 may include a cleaner canister 1302, a sanitizer canister 1304, a first water supply 1306, a first inlet female break 1308, a first inlet male break 1310, a first manifold 1312, a first outlet female break 1314, a first outlet male break 1316, a first mixed product out 1318, a second water supply 1330, a second inlet male break 1332, a second inlet female break 1334, a second manifold 1336, a second outlet male break 1338, a second outlet female break 1340, and a second mixed product out 1342. It should be noted that any cleaning product can be utilized in cleaner canister 1302 and/or that any sanitizer product can be utilized in sanitizer canister 1304. Further, based on the configuration of the first inlet female break 1308, the first inlet male break 1310, the first outlet female break 1314, the first outlet male break 1316, the second inlet male break 1332, the second inlet female break 1334, the second outlet male break 1338, and the second outlet female break 1340, the cleaner canister 1302 and the sanitizer canister 1304 cannot be placed in the wrong position. In other words, the sanitizer canister 1304 cannot be located and/or coupled to the cleaner canister's 1302 position because the female and male breaks are not aligned to do so. Further, the cleaner canister 1302 cannot be located and/or coupled to the sanitizer canister's 1304 location because the female and male breaks are not aligned to do so. The units are designed to not allow the cleaner to attach to the sanitizer (or active chemical A or B) and also in both cases you cannot connect the water inlet to the outlet side and visa-versa.

Figure 14A:
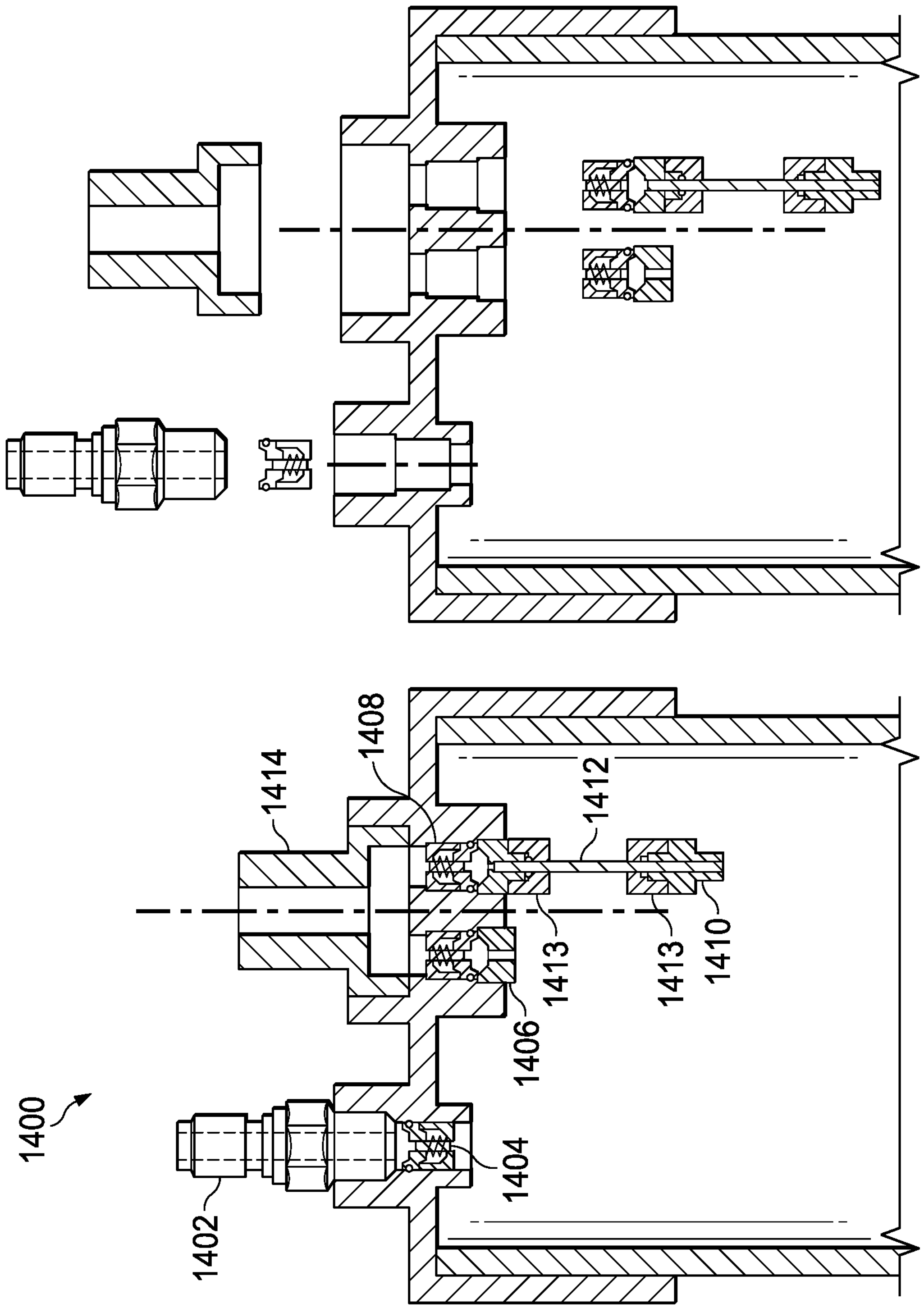
FIG. 14A is an illustration of a molded device, according to one embodiment.

In FIG. 14A, an illustration of a molded device is shown, according to one embodiment. A device 1400 may include an inlet quick connect dry break fitting 1402, a water inlet check valve 1404, a water outlet check orifice 1406, a check valve retainer 1408, a bag-in-bottle lap retainer 1410, a media tube orifice 1412, a seal housing(s) 1413, and/or a mixed manifold outlet 1414.

Figure 14B:
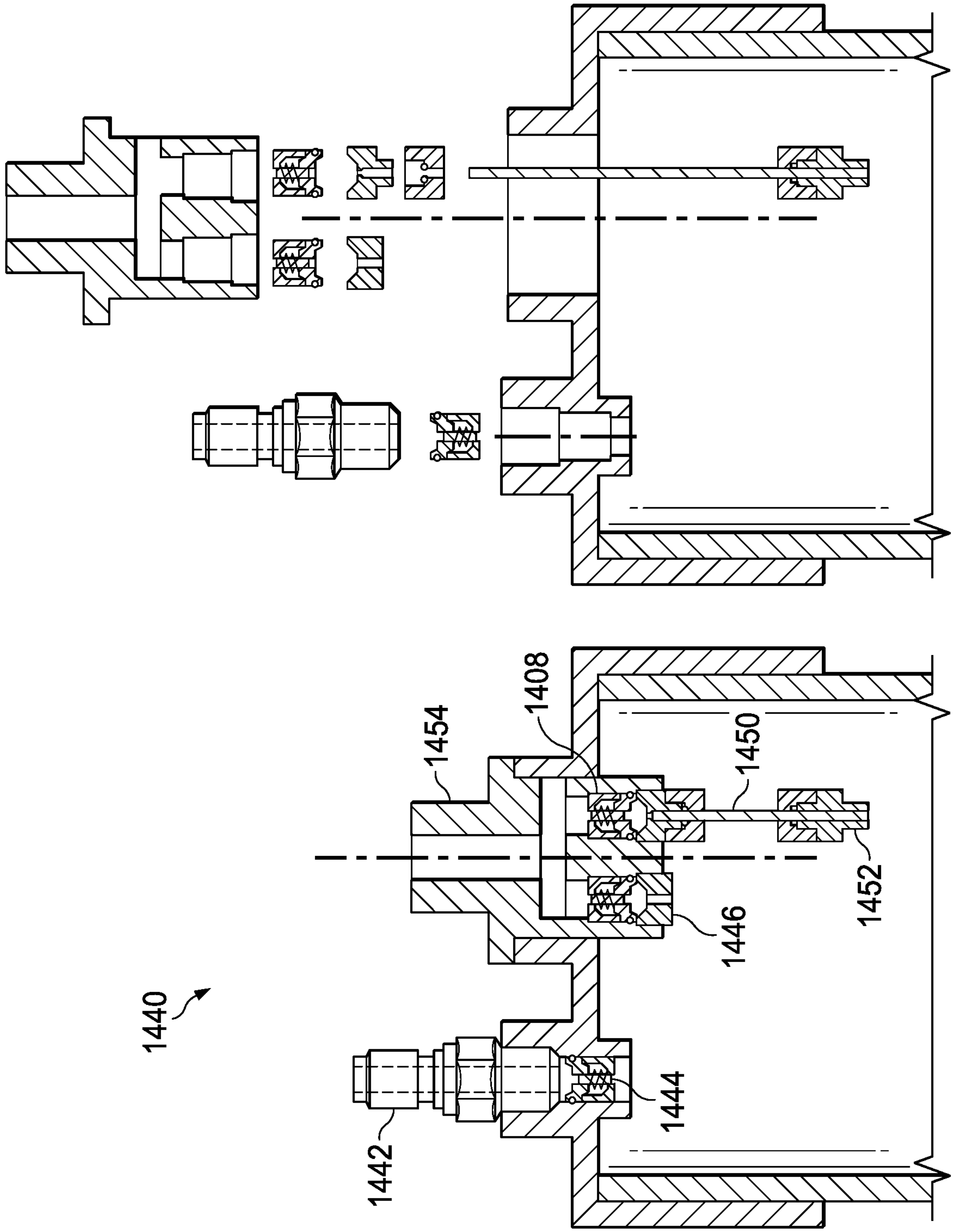
FIG. 14B is an illustration of a stand-alone mix manifold, according to one embodiment.

In FIG. 14B, an illustration of a stand-alone mix manifold is shown, according to one embodiment. A device 1440 may include inlet quick connect dry break fitting 1442, a water inlet check valve 1444, a water outlet orifice 1446, a media check valve retainer 1448, a media tube orifice 1450, and/or a bag-in-bottle cap retainer 1452.

The length of the tube orifice will dictate the flow rate of the active ingredient in the bag and therefore the ratio of the water to the active ingredient. For example with Sanitizer A the tube orifice length is 13.5 inches based on the viscosity of Sanitizer A this will create a ratio of 514 to 1 (parts water to parts active) at a 0.50 oz. per second total mixed product flow rate and 341 to 1 (parts water to parts active) at a 0.9 oz. per second total mixed product flow rate. With Cleaner B the tube orifice length is 9.5 inches based on the viscosity of Cleaner B this will produce a ratio of 60 to 1 (parts water to parts active) at a 0.50 oz. per second total mixed product flow rate and a ratio of 32 to 1 (parts water to parts active) at a 0.90 oz. per second flow rate. If the ratio of water to active is to be reduced, the flow rate of the active is increased (stronger mixed product) by reducing the length of the tube orifice and if the ratio of water to active is to be increased, the flow rate of the active is reduced (weaker mixed product) by increasing the length of the tube orifice.

The interior pressure is the same on both canisters but the flow rate is different on each, due to the length of the tube. This allows for different application rates but to be empty on the same day to minimize re-installation, i.e. both canisters are empty at the same time. In various example, the need to replace canisters is predictable, a certain day, X days hence. No continuing monitoring is necessary. No wasted labor and no human error.

Figure 15:
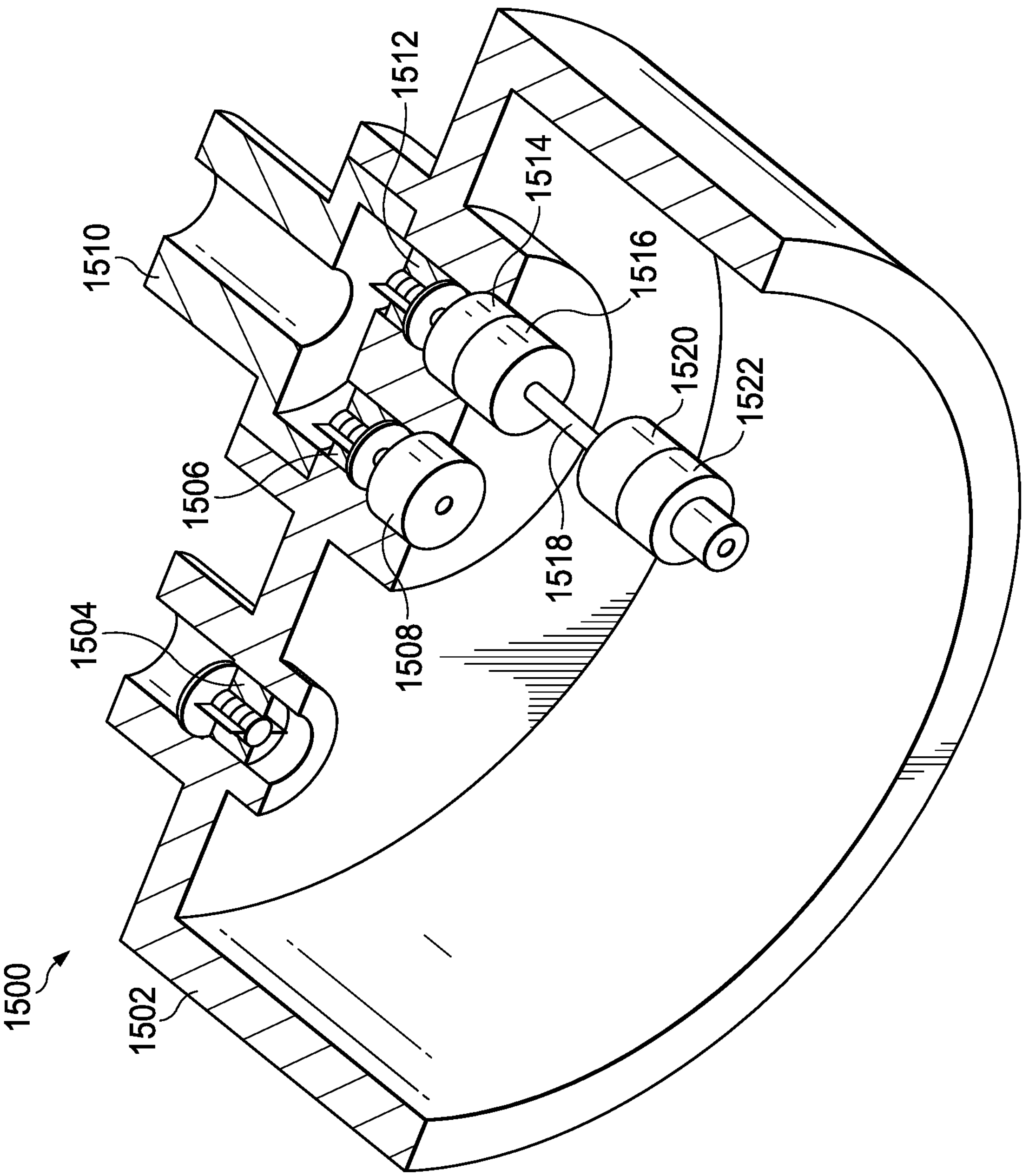
FIG. 15 is an illustration of a cap of a canister, according to one embodiment.

In FIG. 15, an illustration of a cap of a canister is shown, according to one embodiment. A cap may include a manifold cap 1502, a water inlet check valve 1504, a water outlet check valve 1506, a water orifice check valve plug 1508, a mixed manifold outlet 1510, a media outlet check valve 1512, a media check valve retainer 1514, a seal housing 1516, a media tube orifice 1518, a seal housing 1520 and/or a bag-in-bottle cap retainer 1522.

Figure 16:
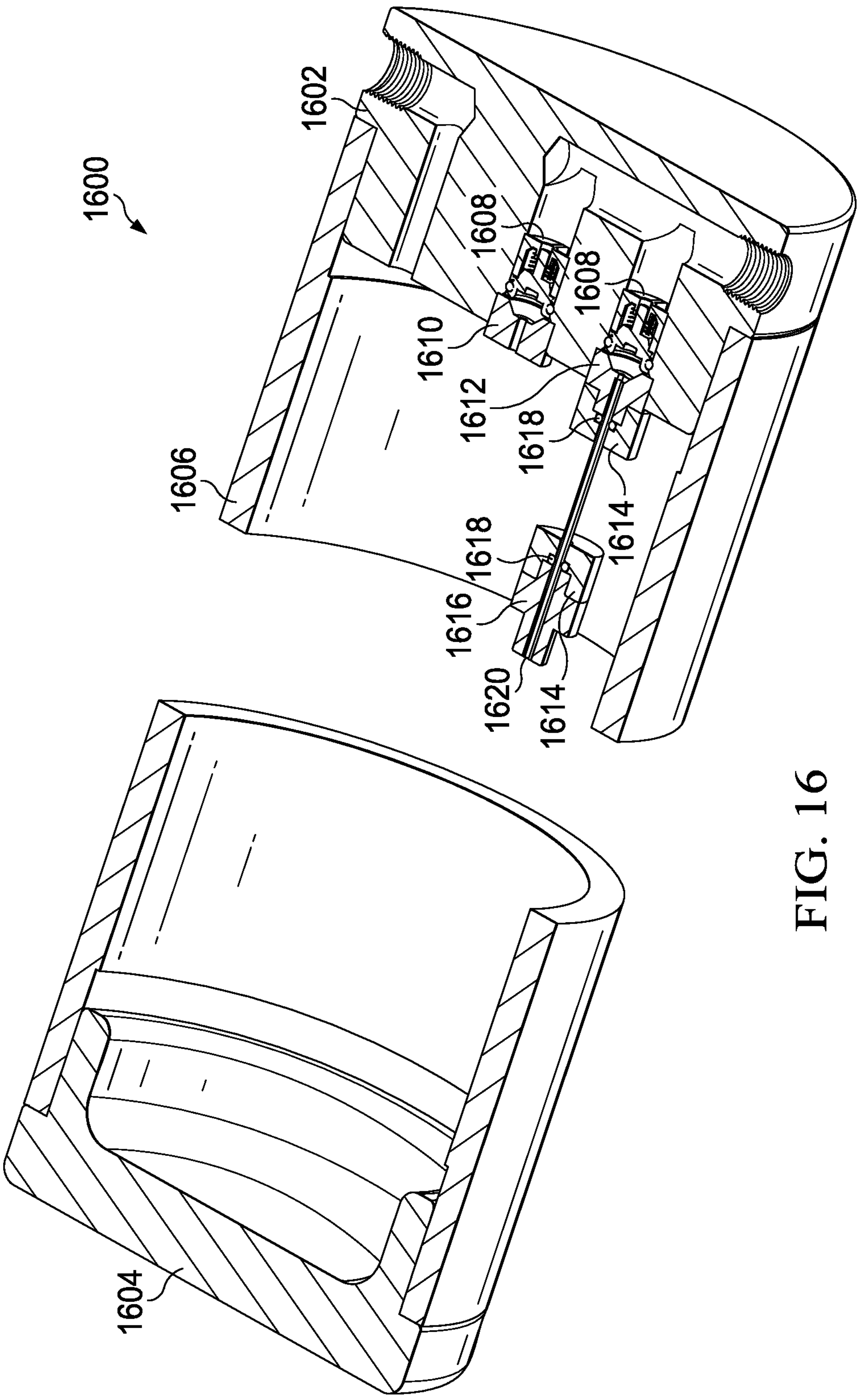
FIG. 16 is another illustration of a cap of a canister, according to one embodiment.

In FIG. 16, another illustration of a cap of a canister is shown, according to one embodiment. A cap 1600 may include a 3" SCH 40 CIP UHR glued Manifold plug 1602, a 3" SCH 40 CIP HUR glued end plug 1604, a 3" SCH 40 CIP UHR glued pipe bore 1606, a check valve 1608, a water orifice check valve plug 1610, an UHR check valve retainer 1612, an UHR seal housing 1614, an UHR Bib Cap retainer 1616, an O-ring 1618, and/or an orifice tube 1620.

Figure 17:
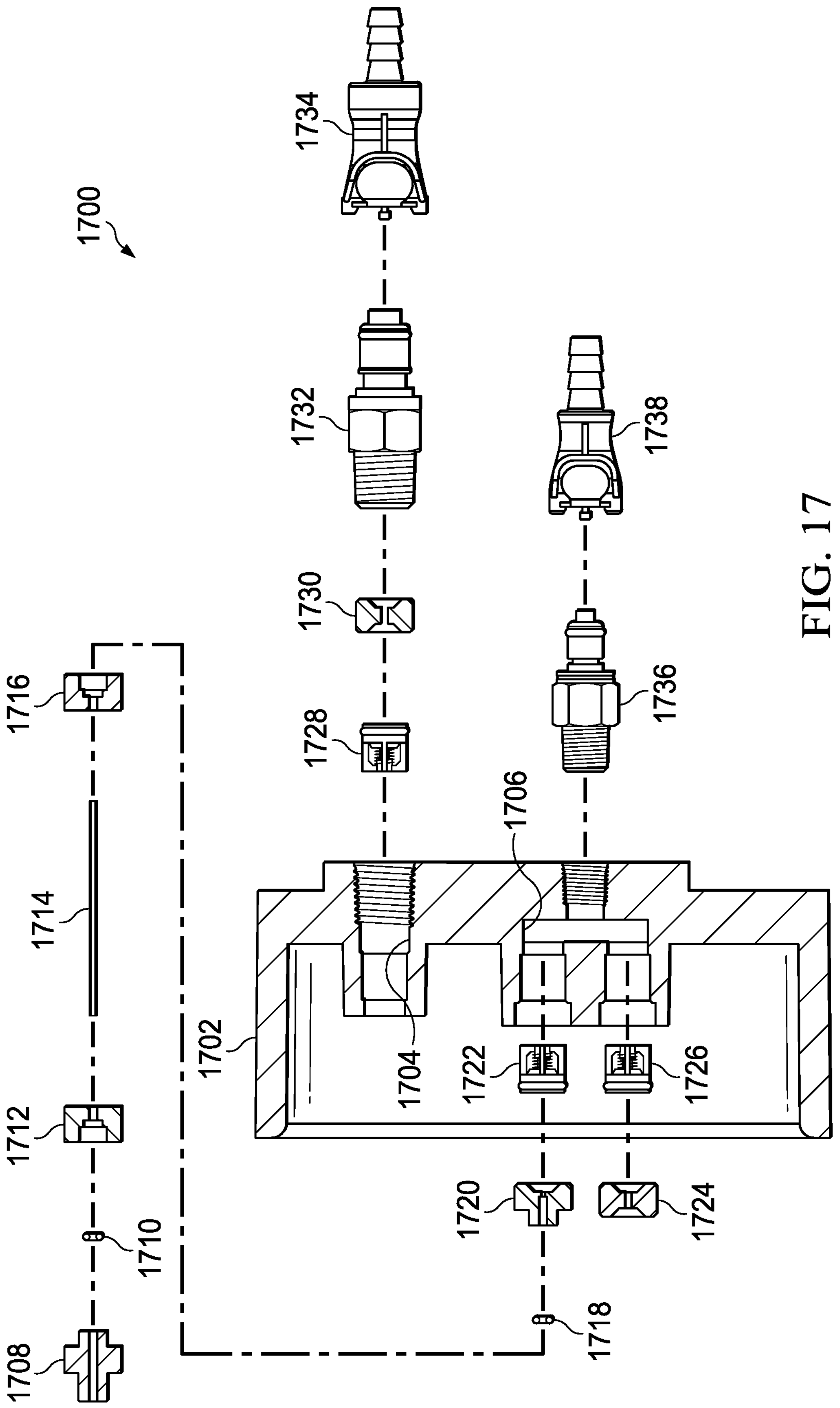
FIG. 17 is an illustration utilizing a CFValve, according to one embodiment.

In FIG. 17, an illustration utilizing a CFValve is shown, according to one embodiment. A device 1700 may include a manifold cap 1702, a water inlet passage 1704, a mixed manifold outlet passage 1706, a bag-in-bottle cap retainer 1708, an O-ring 1710, a seal housing 1712, a media tube orifice 1714, a seal housing 1716, an O-ring 1718, a media check valve retainer 1720, a media check valve 1722, a water orifice check valve plug 1724, a water check valve 1726, a water inlet check valve 1728, a water inlet check valve retainer 1730, a water inlet quick connect dry break 1732 (e.g., male), a water inlet quick connect dry break 1734 (e.g., female), a mixed media outlet quick connect dry break 1736 (e.g., male), and/or a mixed media outlet quick connect dry break 1738 (e.g., female).

Figure 18:
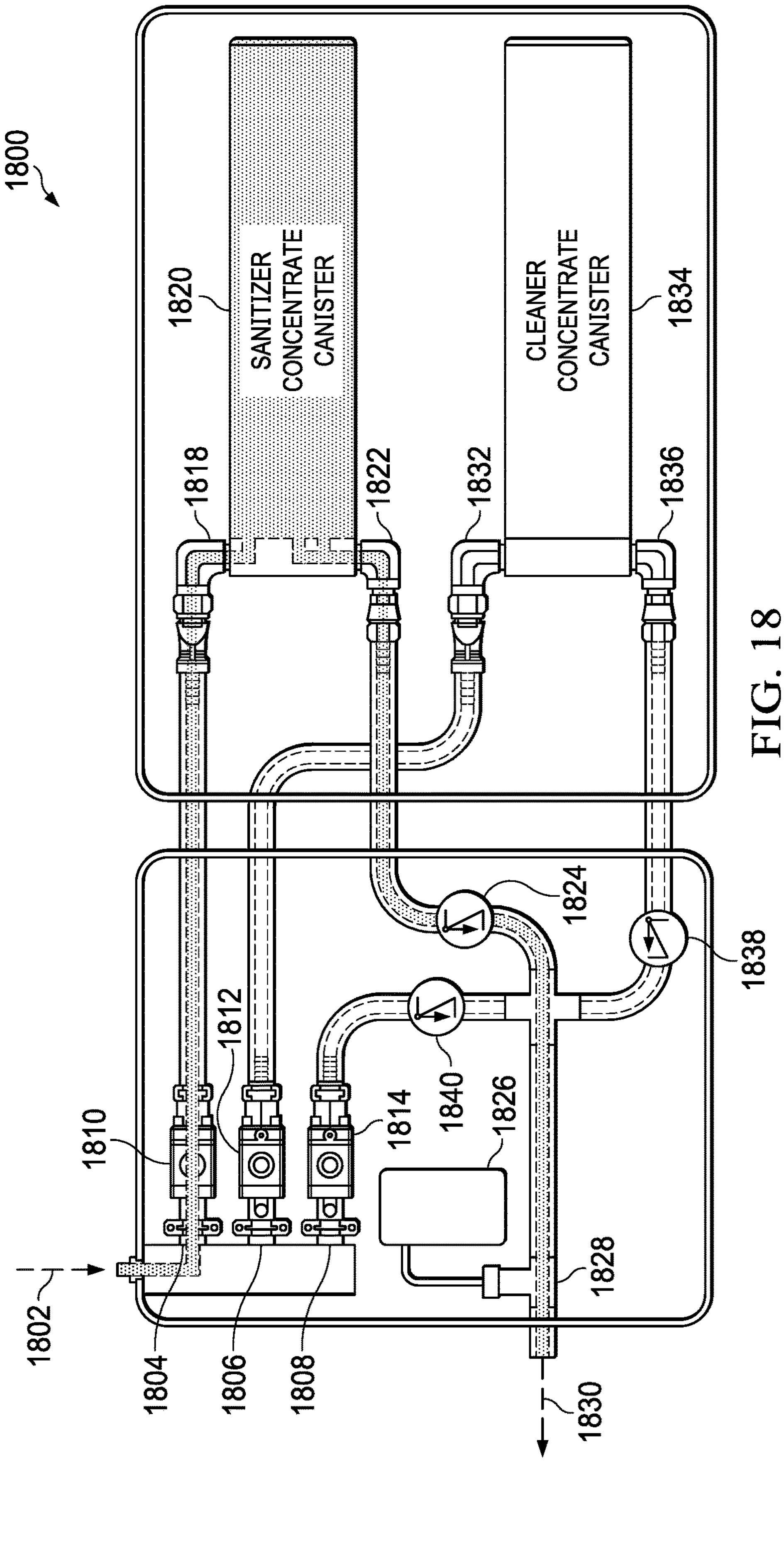
FIG. 18 is an illustration of a sanitation system, according to one embodiment.

In FIG. 18, an illustration of a sanitation system is shown, according to one embodiment. A sanitation system 1800 may include a water supply inlet 1802, a sanitizer CFValve circuit 1804, a cleaner CFValve 1806 circuit, a water flush circuit 1808, a sanitizer CFValve 1810 (e.g., CFive), a cleaner CFValve 1812 (e.g., CFive), a water flush CFValve 1814 (e.g., CFive), a first water inlet dry break fitting 1818, a sanitizer concentrate canister 1820, a first diluted sanitizer outlet dry break fitting 1822, a first check valve 1824, a total dissolved solids controller 1826 with one or more sensors, a total dissolved solids TDS meter and sensors 1828, a diluted solution outlet 1830, a second water inlet dry break fitting 1832, a cleaner concentrate canister 1834, a diluted cleaner outlet dry break fitting 1836, a second check valve 1838, and/or an Nth check valve 1840. In various examples, the system can have only one canisters or up to Nth canisters (e.g., 1-1,000).

The water source (ie: city water) enters the system through and passes by a pressure regulator through a T the water is directed to the two CFiVes that control the UHR system, the CFiVe controls the pressure of the water to the targeted Pressure into the Canisters, the water enters the canister through the Manifold water inlet and pressurizes the bag of active ingredient which pushes active ingredient through the tube orifice into the mixing manifold where it mixes with water and flows back into the machine through the flow meter/total dissolved solids sensor and into the manifold via the incoming sanitation solenoid, one the cleaning or sanitation mixed solution is in the solenoid manifolds it then passes through each of the various solenoids downstream to sanitize/clean that particular circuit in the system.

Figure 19:
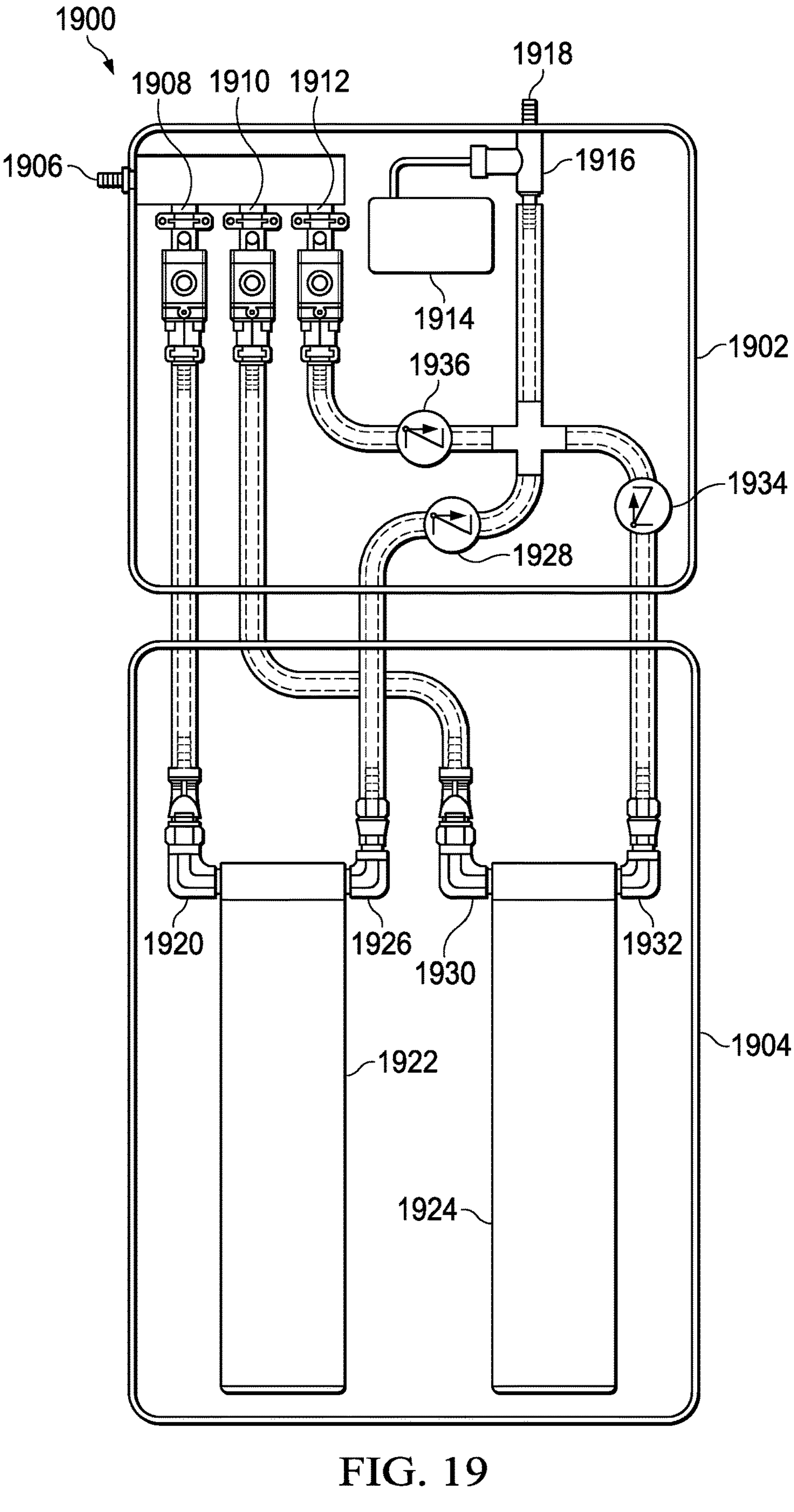
FIG. 19 is another illustration of a sanitation system, according to one embodiment.

In FIG. 19, another illustration of a sanitation system is shown, according to one embodiment. A sanitization system 1900 may include a control box 1902 (and/or boxes) and a cartridge box 1904 (and/or cartridge boxes). The control box 1902 may include a water supply 1906, a sanitation canister controller 1908, a cleaner canister controller 1910, a flush controller 1912, a total dissolved solids controller 1914, one or more total dissolved solids sensors 1916, a first check valve 1928, a second check valve 1934, and an Nth check valve 1936. The cartridge box 1904 may include a sanitation canister water inlet area 1920, a sanitation canister 1922, a sanitation canister mixed product outlet area 1926, a cleaner canister water inlet area 1930, a cleaner canister 1924, and a cleaner canister mixed product outlet area 1932. It should be noted that any number of canisters may be utilized and that any product (e.g., vinegar, chemical A, natural product A, chemical B, etc.) may be in one or more canisters.

For ease of retrofit the cleaning canisters can be mounted outside the machine (behind, below, above), the same water that is utilized inside the machine can be routed out the machine and into a Tee into the CFiVes. When the CFive is actuated the water flows into the canister from the respective CFiVe, the mixed product exits the canister and flows to a T and into the back of the machine to the Solenoid Manifold inside the machine or into the chosen flow path (one or more) that will be cleaned/sanitized within the machine.

Figure 20:
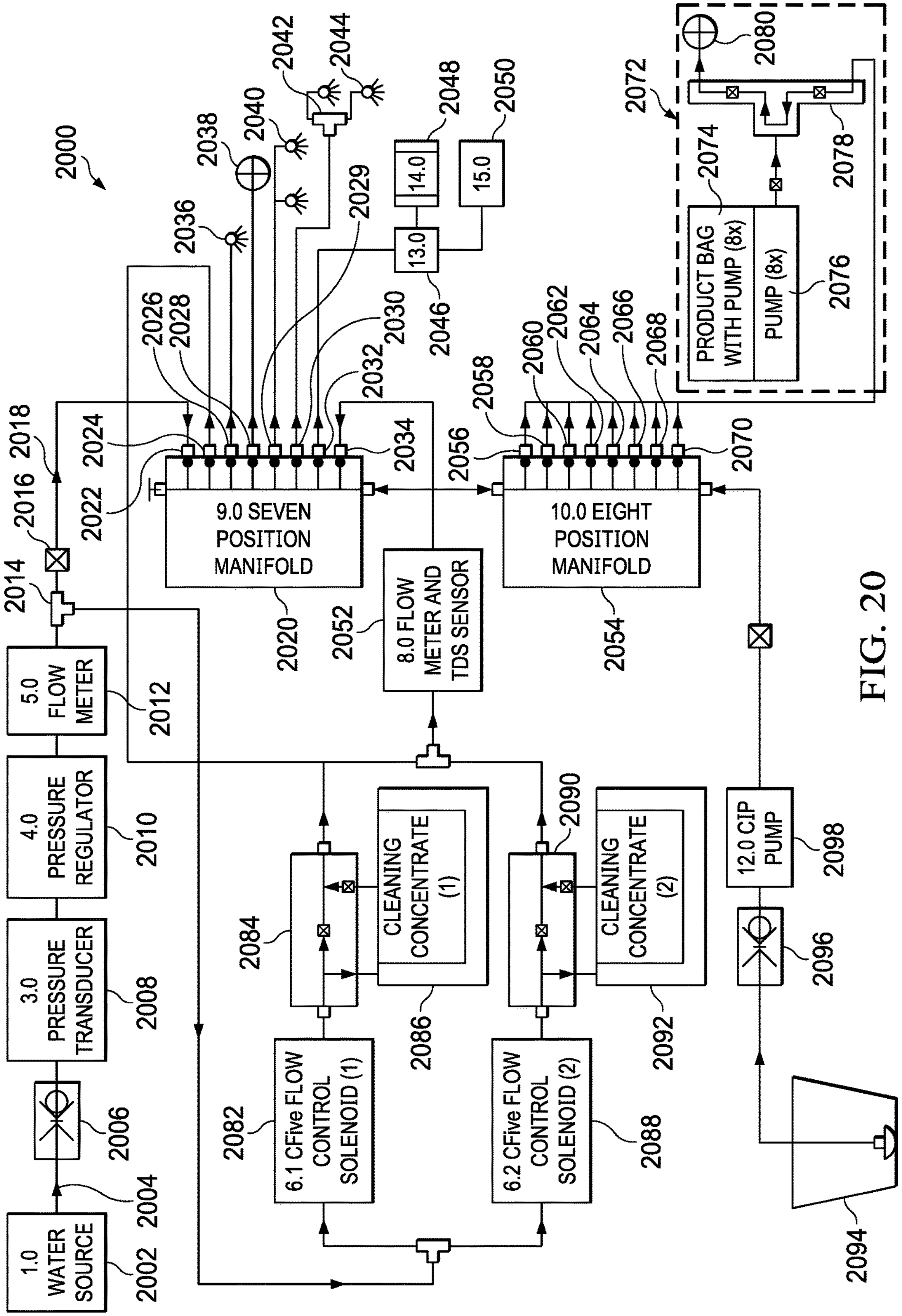
FIG. 20 is another illustration of a sanitation system, according to one embodiment.

In FIG. 20, another illustration of a sanitation system is shown, according to one embodiment. A sanitation system 2000 may include a water source 2002, a first valve 2004, an inlet water fitting 2006, a pressure transducer 2008, a pressure regulator 2010, a flow meter 2012, a second valve 2016, a third valve 2018, a first manifold 2020 (with a first position 2022, a second position 2024, a third position 2026, a fourth position 2028, a fifth position 2029, a sixth position 2030, and a seventh position 2032), an incoming sanitation 2034, a spray head 2036, a LMS valve 2038, a spray head 2040, a T joint 2042, a spray head 2044, a first flow characteristic device 2046, a second flow characteristic device 2048, a third flow characteristic device 2050, a second manifold 2054 (with a first position 2056, a second position 2058, a third position 2060, a fourth position 2062, a fifth position 2064, a sixth position 2066, a seventh position 2068, and an eighth position 2070, a product dispensing line 2072, a product bag with pump 2074, a pump 2076, a T joint 2078, a LMS valve 2080, a CFive flow control solenoid 2082, a third manifold 2084, a flow meter and total dissolved solids sensors 2052, a cleaning concentrate 2086, a second CFive flow control solenoid 2088, a fourth manifold 2090, a second cleaning and/or sanitizer concentrate 2092, a sanitizer/cleaner line 2094, a sanitizer/cleaner fitting 2096, and/or a CIP pump 2098.

Figure 21:
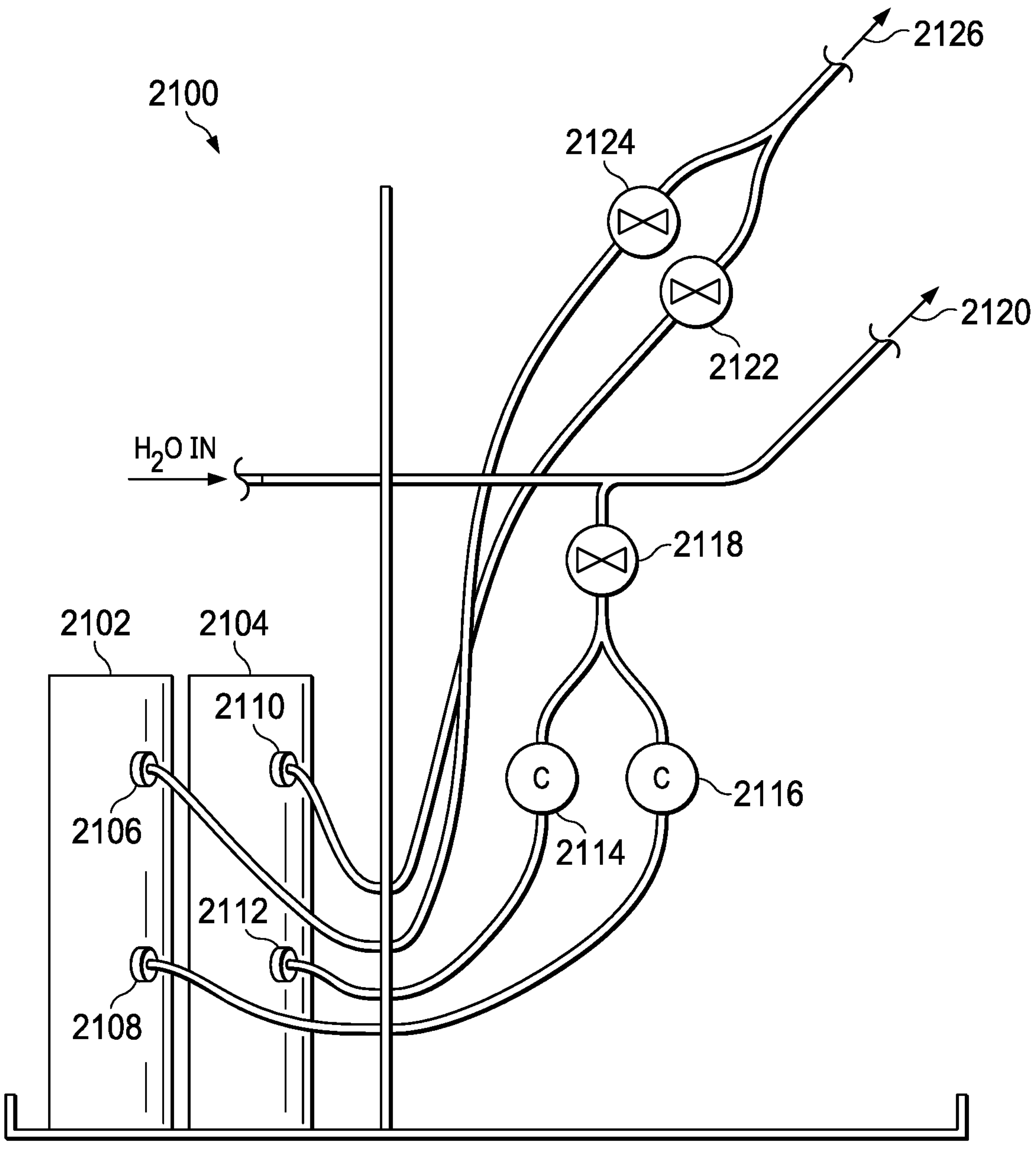
FIG. 21 is another illustration of a sanitation system, according to one embodiment.

In FIG. 21, another illustration of a sanitation system is shown, according to one embodiment. A sanitation system 2100 may include a first canister 2102 (with concentrate), a second canister 2104 (with a different concentrate), a first canister outlet 2106, a first canister outlet 2108, a second canister outlet 2110, a second canister outlet 2112, a first flow control 2114, a second flow control 2116, a first check valve 2118, a second check valve 2122, an Nth check valve 2124, a drink line 2120, and a cleaning/sanitizer/flush line 2126. In one example, two out tubes and two in tubes can fit through same holes.

Figure 22:
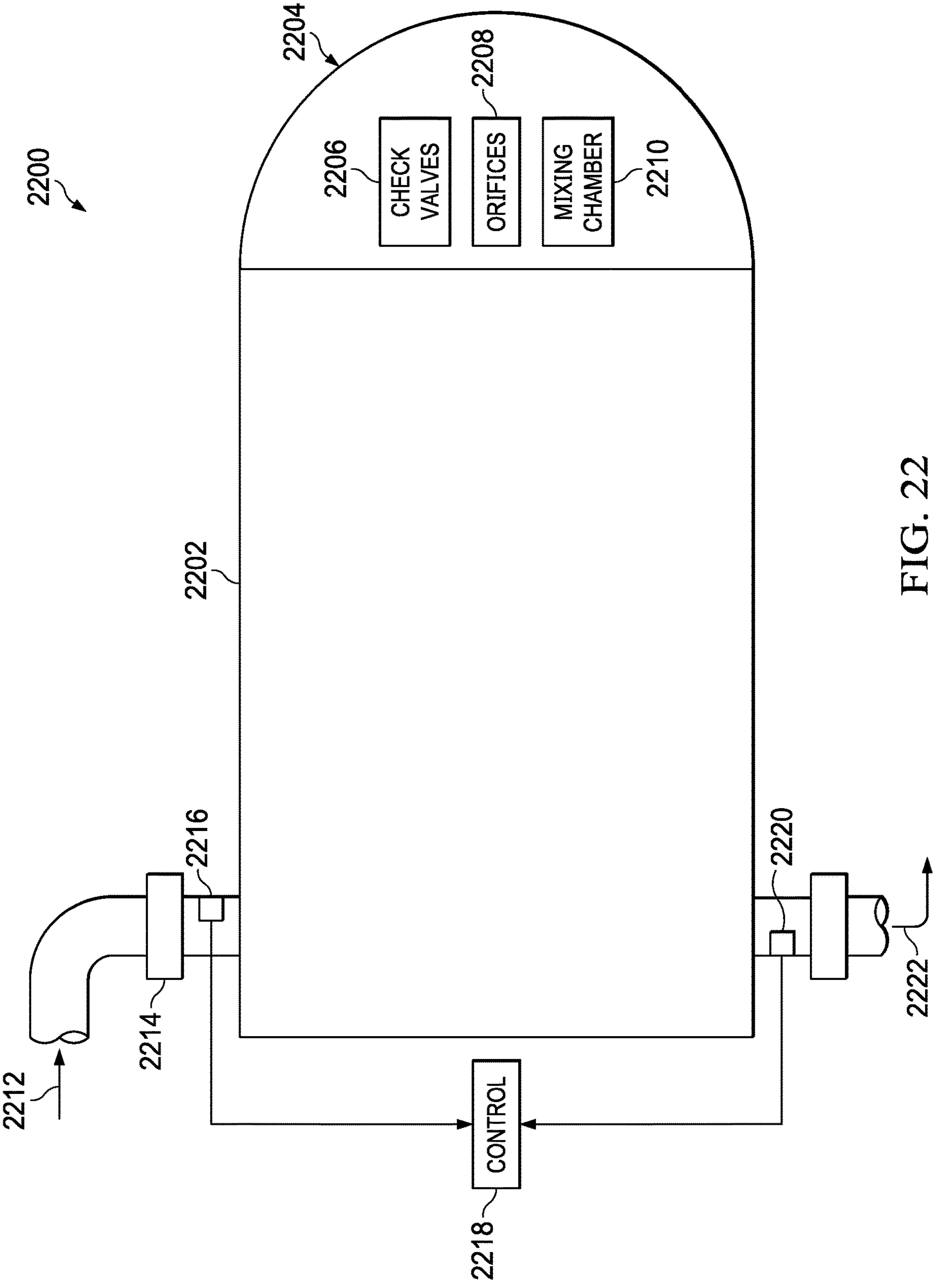
FIG. 22 is an illustration of a canister, according to one embodiment.

In FIG. 22, an illustration of a canister is shown, according to one embodiment. A canister 2200 may include a canister 2202, a cap 2204, one or more check valves 2206, one or more orifices 2208, a mixing chamber 2210, a water source 2212, a CFValve 2214, a first total dissolved solids sensor 2216, a controller 2218, a second total dissolved solids sensor 2220, and a mixture outlet area 2222. In one example, the one or more check valves 2206, the one or more orifices 2208 and the mixing chamber are inside of cap 2204.

In one embodiment, a liquid dispensing system may include: a container enclosing a chamber; a flexible bag in the chamber; a first liquid contained in the bag; a first and second conduits in the chamber, the first conduit connecting the chamber to an outlet port in the container, the second conduit connecting the bag to the first conduit; and a supply source for introducing a pressurized second liquid into the chamber, the first conduit serving to direct an exiting flow of the second liquid from the chamber to the outlet port, with the pressurized second liquid serving to collapse the bag and expel the first liquid contained therein via the second conduit to the first conduit for mixture with the exiting flow of the second liquid. The drinking liquid may be replaced with cleaning and/or sanitizer or anything else in this disclosure and still utilize any of the above-referenced elements and/or configuration.

In another example, the supply source includes a constant flow valve located externally of the container. In another example, the liquid dispensing system includes a check valve in the first conduit for preventing a reverse flow of liquid into the chamber. In another example, the liquid dispensing system includes a check valve on the second conduit for preventing a reverse flow of liquid into the bag. In another example, the liquid dispensing system includes the first conduit includes a metering orifice. In another example, the liquid dispensing system has a second conduit that is a flexible tube. In another example, the check valves comprise duckbill valves. In another example, the supply source is connected to the container by a dry break quick connect coupling. In another example, the first conduit communicates with an upper region of the chamber and the pressurized liquid is introduced into a lower region of the chamber via an inlet port in the container. In another example, the liquid dispenses includes a third open ended bypass conduit arranged between the interior of the container and the bag, the bypass conduit extending from the lower region to the upper region of the chamber.

In another embodiment, a liquid dispensing system may include: a container enclosing a chamber having upper and lower regions; a flexible bag in the chamber, the bag extending vertically between the upper and lower regions; a first liquid contained in the bag; a first, a second and a third conduits in the chamber, the first conduit leading to an outlet port in the container, the second conduit connecting the bag to the first conduit; and a supply source for introducing a pressurized second liquid into the chamber and separately into the third conduit for delivery to the first conduit, the first conduit serving to direct an exiting flow of the second liquid to the outlet port, with the pressurized second liquid in the chamber serving to collapse the bag and expel the first liquid contained therein via the second conduit to the first conduit for mixture with the exiting flow of the second liquid. The drinking liquid may be replaced with cleaning and/or sanitizer or anything else in this disclosure and still utilize any of the above-referenced elements and/or configuration.

In another example, the supply source includes a constant flow valve located externally of the container. In another example, the liquid dispensing system includes a check valve in the first conduit for preventing a reverse flow of liquid into the chamber. In another example, the liquid dispensing system includes a check valve on the second conduit for preventing a reverse flow of liquid into the bag. In another example, the first conduit includes a metering orifice. In another example, the pressurized liquid is introduced into a T-fitting in the chamber, the T-fitting having one branch communicating with the third conduit and having another branch communicating with the chamber.

In one embodiment, a liquid dispensing system may include: a first container enclosing a chamber; a flexible container in the chamber; a first liquid contained in the flexible container; a first conduit and a second conduit in the chamber, the first conduit connecting the chamber to an outlet port in the first container, the second conduit connecting the flexible container to the first conduit where the second conduit is coupled to the flexible container at a flexible container outlet location, wherein the second conduit is connected to the chamber via an orifice and the output port; a supply source for introducing a pressurized second liquid into the chamber, the first conduit serving to direct an exiting flow of the pressurized second liquid from the chamber to the outlet port, with the pressurized second liquid serving to collapse the flexible container and expel the first liquid contained therein via the second conduit to the first conduit for mixture with the exiting flow of the pressurized second liquid; and/or a third conduit arranged between an interior of the first container and the flexible container, the third conduit extending from a lower region to an upper region of the chamber and coupled to a T-fitting in the chamber. The drinking liquid may be replaced with cleaning and/or sanitizer or anything else in this disclosure and still utilize any of the above-referenced elements and/or configuration.

In another example, the supply source includes a constant flow valve located external of the first container. In another example, the liquid dispensing system may include a first check valve configured to prevent a reverse flow of liquid into the chamber or further comprising a second check valve on the second conduit for preventing a reverse flow of liquid into the flexible container. In another example, the first check valve or the second check valve may be duckbill valves. In another example, the first conduit includes the orifice. In another example, the second conduit comprises a flexible tube. In another example, the supply source is connected to the container by a dry break quick connect coupling. In another example, the first conduit communicates with the upper region of the chamber, and wherein the pressurized second liquid is introduced into the lower region of the chamber via an inlet port in the first container wherein the flexible container outlet location is located at a bottom part of the flexible container. In another example, the first conduit comprises the orifice fitted to an opposite end of an elbow fitting. In another example, the second conduit comprises a first check valve to provide a connection between the chamber and the outlet port.

In another embodiment, a liquid dispensing system may include: a first container enclosing a chamber; a flexible container in the chamber; a first liquid contained in the flexible container; a first conduit and a second conduit in the chamber, the first conduit connecting the chamber to an outlet port in the first container, the second conduit connecting the flexible container to the first conduit where the second conduit is coupled to the flexible container at a flexible container outlet location; a supply source for introducing a pressurized second liquid into the chamber, the first conduit serving to direct an exiting flow of the pressurized second liquid from the chamber to the outlet port, with the pressurized second liquid serving to collapse the flexible container and expel the first liquid contained therein via the second conduit to the first conduit for mixture with the exiting flow of the pressurized second liquid; one or more check valves for preventing a reverse flow of liquid into the chamber or into the flexible container; and/or a third conduit arranged between an interior of the first container and the flexible container, the third conduit extending from a lower region to an upper region of the chamber and coupled to a T-fitting in the chamber. The drinking liquid may be replaced with cleaning and/or sanitizer or anything else in this disclosure and still utilize any of the above-referenced elements and/or configuration.

In another example, the supply source includes a constant flow valve located external of the first container. In another example, the first conduit includes a metering orifice. In another example, the second conduit comprises a flexible tube. In another example, the supply source is connected to the first container by a dry break quick connect coupling. In another example, the first conduit communicates with the upper region of the chamber, and wherein the pressurized second liquid is introduced into the lower region of the chamber via an inlet port in the first container wherein the flexible container outlet location is located at a bottom part of the flexible container. In another example, the supply source is connected to the first container by a dry quick break connect coupling to a nipple structure. In another example, the liquid dispensing system may include a T-shaped fitting coupled to the third conduit and the lower region of the chamber.

Existing systems for cleaning beverage, ice cream, ovens and other food equipment are very reliant on labor and efficacy of the cleaning can be impacted by the employee's calculation of dilution factor, remembering/choosing to run the daily, hourly and weekly cleaning cycles. This is subject to serious error and with increased focus on cleaning for quality and safety and with increased awareness by recent global events, restaurants, convenient stores, fast food, institutional purveyors and regulators need better guarantees that equipment is being cleaned appropriately and to the standards require.

Additionally, there is an opportunity for much improved environmental impact and business system impact by providing high and ultra-high ratio concentrates that are diluted on demand reducing package size, shipping size and frequency and dramatically reducing the carbon footprint and costs of delivering cleaning, sanitizing, descaling and other concentrates.

In an existing bucket and pump system measured chemicals are poured into bucket and filled with water to correct level mark on bucket and stir to mix. This bucket is then carried to the front of machine and pump through to sanitize. There are many chances for error in measurement of chemical and/or water in this procedure. Further skin contact of chemicals, carry bucket/spills etc. is problematic. In addition to a ratio control problem, there is a time issue and quality control issues. For example, time between cleaning, as well as time for solution to be present in plumbing to be effective. Furthermore, employee may just skip doing it as it is difficult to do especially in a crowded store. Another issues, is inconsistences on when and how the device is cleaned. For example, a first employee may clean the system at the appropriate time but not at the appropriate ratios. A second employee may not clean the system at all. While, a third employee may clean the system at the appropriate times with the appropriate ratio. In another system, a ChemStation type—fill bucket with chemicals and water each by weight has the same issues noted above. In another example, an Ecolab type may be done by filling a bucket by timed run of peristaltic pump has the same issues noted above. In addition, weekly service to "top off" large storage tank containing a mixed solution—gravity feed to bucket has the same issues noted above.

NOTE: none of the systems now in service have the Clean In Place feature, i.e. UHR concentrate internal to the machine using the same city water supply—does not require an additional water connection to the machine, and machines own computer will turn on and off as required. These may all be in one or more embodiments disclosed in this document.

A Clean in Place method of sanitation that is internal to the machine being cleaned. One or more Ultra High Ratio canisters of concentrated chemical cleaning liquid, may be calibrated to perform the cleaning cycle for a period weeks or months without having to be replaced. The canisters are mounter internal to the machine, plumbed into the machine's water supply source to be cycled on and off as necessary by the machines computer system. When the sealed, single use, canister is empty the machine may stop serving until the empty canister[s] is disconnected at the dry break and is replaced with a new cartridge.

Note the same clean in place system can be situated beside, behind, beneath the machine or even in the backroom of the facility. It can be automatically run by its own controller/computer/timer in the same way the internal-inside machine is run.

One example is a double bag design. The canister may be constructed with a double bag inside a ridged body if there is a chemical compatibility. The interior bag contains the cleaning chemicals and intern is contained in outer bag. The water to supply the pressure and to mix with the solution is fed in between the two bags and expands outward to be contained by the outer ridged body. There is a vent in the ridged body to allow the air to escape as the bag is filled. The benefit of the double bag system is that there is a vacuum between the two bags and there is no change of air being compressed changing the ratio of the concentrate to water mixture.

Another example is a single bag design. The single bag design uses a bag inside a ridged canister. The water supply fills the canister and compresses the bag.

The canister may be assembled with all components built into the cap—check valves, mixing chamber, orifice, etc. This makes for simple assembly and reduced costs (this is different than the current UHR design). Additionally, there may be dry breaks in the canister that allow for a dry/quick connect on the inlet water and the diluted outbound solution. This is an advantage for when the canister is replaced when it is empty. The inlet and outlet dole feature is designed so that it can be placed at any angle to accommodate where it resides in the machine. Dole fittings would allow a universal installation as the supply/discharge would be in any direction.

A system can have single or multiple canisters to allow for different chemicals (i.e.: cleaner, sanitizer, descaler) and also to have multiple different cycles utilizing one or more of the chemicals for varying different lengths of time as needed to clean for different products (i.e.: coffee, milk, juice, ice cream, steam oven, etc.) Multiple canisters would be an advantage because the cleaning for different products [juice or milk] may require a different chemical or a different time to flush.

All of the cycles are controlled either through the controller of the existing equipment or by an external controller/computer built into the CFV-UHR-CIP kit. For example, a smoothie machine may run 4 hour sanitation, daily clean (short) and weekly clean (long) cycles. The built in system will shut down the machine every four hours and run the four hour cycle, and once a day to run the daily cycle and then once a week for the weekly cycle. The machine will be in operable during the cleaning cycle and will automatically be flushed with clean water after the cycle. Furthermore, there is a Total Dissolved Solids meter and/or sensors that measures the dissolved solids in the city water and then the dissolved solids in the mixed chemical. This will tell the system (whether internal or external) whether the chemical amount is on target and will provide a sold out feature to notify of chemical replacement. Also, the "sold out" feature can be utilized to shut down the entire machine so there is no way for an employee to allow a "dirty" machine to dispense/cook/mix product.

The canisters can be designed to be single use or recyclable. However, they are designed to be plug and play to the system (again through the dry break connections). The dry break connections are "pokey-oked" so that the operator/employee can NOT connect the inlet to the outlet in error and can NOT connect the wrong chemical cartridge to the wrong inlet/outlet port (i.e.: cleaner to the sanitizer port).

The design of the orifice tube connection to the bag and to the manifold provides a streamline approach that doesn't allow kinking or compression in the canister.

Because the inlet water is controlled by an electronically actuated CFValve it provides a constant pressure and ability to electronically actuate based on time of day and length of desired clean. Furthermore the addition of the CFiVe for the flush and TDS circuit allows the system to be automatically flushed after use and fore (or force) the TDS sensor to take a baseline water dissolved solids reading to apply the Delta calculation to ensure the proper dilution/strength of the chemical and sold out feature.

In light of the foregoing, it will now be appreciated by those skilled in the art that the present disclosure embodies a number of significant advantages, the foremost being the automatic pressure responsive control of fluid flow between a variable pressure source and an applicator from which the fluid is to be applied in a substantially uniform manner. The regulating valve is designed for low cost mass production, having a minimum number of component parts, the majority of which can be precision molded and automatically assembled.

In one example, a regulating valve for maintaining a substantially constant flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being axially supported exclusively by the circular rim and having a peripheral flange overlapping the cylindrical side wall; a piston assembly secured to the center of the diaphragm, the piston assembly having a cap on one side of the diaphragm facing the inner side of the barrier wall, and a base suspended from the opposite side of the diaphragm and projecting into the interior of the cup; a stem projecting from the cap through the first passageway in the barrier wall to terminate in a valve head, the valve head and the outer side of the barrier wall being configured to define a control orifice connecting the inlet port to the diaphragm chamber via the first passageway; and a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, with the valve head on the stem being correspondingly moved to adjust the size of the control orifice, thereby maintaining a substantially constant flow of fluid from the inlet port through the first and second passageways to the outlet port for delivery to the fluid outlet.

In another example, a regulating valve for controlling the flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being supported exclusively by the circular rim and having a peripheral flange overlapping the cylindrical side wall; a piston assembly secured to the center of the diaphragm, the piston assembly having a base projecting into the interior of the cup; a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, thereby accommodating a flow of fluid from the inlet port through the first and second passageways to the outlet port for delivery to the fluid outlet.

In another example, the control orifice is defined by frusto conical surfaces on the valve head and the outer side of the barrier wall. In another example, the cross sectional area of the control orifice is less than the cross sectional area of the first passageway throughout the range of movement of the valve head in response to fluid pressure applied to the diaphragm. In another example, the regulating valve further includes a vent passageway leading from the interior of the cup to the exterior of the housing. In another example, the housing is exteriorly provided with a deflecting surface adjacent to the outlet of the vent passageway, the deflecting surface being configured and arranged to direct fluid escaping from the interior of the cup in the general direction of fluid flowing through the valve, but angularly away from the valve axis. In another example, the base of the piston assembly is spaced from the bottom wall of the cup by an open gap, and wherein the spring means comprises a coiled spring bridging the gap and in contact at its opposite ends with the bottom wall and the base. In another example, the piston assembly is centered within the cup solely by the resilient support provided by the diaphragm. In another example, the housing is comprised of mating plastic inlet and outlet sections, the sections being formed by injection molding and being permanently assembled one to the other by sonic welding. In another example, the cap and base of the piston assembly are each injection molded of plastic and joined one to the other by sonic welding, with a central portion of the diaphragm held there between.

In one example, a dispensing device includes a valve configured to interact with an inlet stream, the inlet stream having a first pressure, the valve having an outlet area with an outlet stream, the outlet stream having a second pressure, and a solenoid which interacts with the outlet stream. In addition, the dispensing device may have: at least one of the inlet stream and the outlet stream being a carbonated water; the first pressure is greater than the second pressure; a size of the solenoid is reduced based on a reduction in pressure from the first pressure to the second pressure; a size of the solenoid is reduced based on the valve; the inlet stream is a utility line; the orifice is fixed; the orifice is adjustable; the orifices are both fixed and adjustable; and the valve is a CF Valve. The CF Valve is a regulating valve for maintaining a substantially constant flow of fluid from a variable pressure fluid supply to a fluid outlet, the CFValve may including one or more of: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, the dispensing device may further include: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

The dispensing device may further include a carbonated unit. In another example, the movement device is a magnet. In another example, the movement device is an electromagnet. In another example, the dispensing device may have at least one of the one or more flavor units may be selectable. In addition, the at least one of the one or more flavor units may be automatically selectable.

In one embodiment, the cartridge includes: a body with a first groove and a second groove, the body including a body inlet area and a body outlet area; an O-ring coupled to body via the first groove; a throttle pin coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm.

In addition, the cartridge may be configured to be inserted into a device. Further, the cartridge may be configured to be inserted into an existing device where the existing device has one or more inlet ports and outlet ports in any locations on the existing device. In addition, a cartridge inlet area and a cartridge outlet area may be in series with each other. Further, a cartridge inlet area and a cartridge outlet area may be at a 90 degree angle to each other (and/or any other angle and/or any other angle disclosed and/or shown in this document). In addition, the body may include a 360 degree outlet passage. Further, the spring cap may be configured to create a seal by compressing the diaphragm to the body. Further, the cartridge may include a CF Valve.

In another embodiment, a movement system includes: a cartridge with a cartridge inlet area and a cartridge outlet area; a housing with a housing inlet area and a housing outlet area; wherein the cartridge transfers at least one or more gases and one or more liquids from the housing inlet area to the housing outlet area independent of a relative position of the cartridge inlet area to the housing inlet area and the cartridge outlet area to the housing outlet area. In addition, the cartridge may include a body with a first groove, a body inlet area, and a body outlet area. In addition, the cartridge may include an O-ring coupled to body via the first groove. Further, the cartridge may include a throttle pin coupled to the inlet area. In addition, the cartridge may include a spring cap with a groove area, a spring cap inlet area, a spring cap outlet area, and a spring cap O-ring coupled to the spring cap via the groove area. Further, the cartridge may include a spring coupled to a bottom retainer. Further, the cartridge may include a diaphragm coupled to the bottom retainer. In addition, the cartridge may include a top retainer coupled to the diaphragm. In addition, the cartridge may include a CF Valve.

In another embodiment, a cartridge includes: a body with a first groove and a second groove, the body including a body inlet area and a body outlet area; an O-ring coupled to body via the first groove; a throttle pin including a pin and a pinhead coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm. In addition, the at least one of the pin and the pinhead may have a ratio of greater than 1 to the body. Further, the at least one of the pin and the pinhead may have a ratio of less than 1 to the body. In addition, the cartridge may be configured to be inserted into a device. Further, the cartridge may be configured to be inserted into an existing device where the existing device has one or more inlet ports and outlet ports in any locations on the existing device.

In one embodiment, a cleaning system for a drink dispensing device includes: a cleaner canister coupled to a water source; a cleaner CFValve coupled to the water source which provides a first water flow to the cleaner canister. The cleaner canister may provide a cleaner solution to one or more parts of the drink dispensing device.

In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. In another example, the cleaning system may include a water flush device coupled to the water source and a water flush CFValve coupled to the water source which provides a third water flow to the one or more parts of the drink dispensing device.

In another example, the cleaning system may include an inlet dry breaking fitting and an outlet dry breaking fitting on the sanitizer canister. In another example, the cleaning system may include an inlet dry breaking fitting and an outlet dry breaking fitting on the cleaner canister. In another example, the cleaning system may include a total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. A water flush device coupled to the water source and a water flush CFValve coupled to the water source which provides a third water flow to the one or more parts of the drink dispensing device. A total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device; a water flush device coupled to the water source and a water flush CFValve coupled to the water source which provides a third water flow to the one or more parts of the drink dispensing device. A total dissolved solids device which measures an inlet total dissolved solids and an outlet total dissolved solids. An inlet dry breaking fitting and an outlet dry breaking fitting on the sanitizer canister. An inlet dry breaking fitting and an outlet dry breaking fitting on the cleaner canister. A controller that controls one or more ratios based on the inlet total dissolved solids and the outlet total dissolved solids. In another example, one or more of the cleaner CFValve, the sanitizer CFValve, and the water flush CFValve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, one or more of the cleaner CFValve, the sanitizer CFValve, and the water flush CFValve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In another embodiment, a cap for a canister may include: a CFValve coupled to a cleaning solution source; a tube coupled to the CFValve to transport a cleaning solution; and a tube outlet area to deliver the cleaning solution.

In another example, the tube has a first length and the delivered cleaning solution has a first cleaning solution concentration based on the first length. In another example, the tube has a second length and the delivered cleaning solution has a second cleaning solution concentration based on the second length. In another example, a second tube that has a second length and the delivered cleaning solution has a second cleaning solution concentration based on the second length and wherein the tube has a first length and the delivered cleaning solution has a first cleaning solution concentration based on the first length and wherein the first cleaning solution concentration is different than the second cleaning solution concentration.

In another embodiment, a canister may include: a body with an inlet and an outlet; a cap including a mixing chamber, one or more orifices, and one or more check valves; the inlet coupled to the cap, a CFValve, and a first total dissolved solids sensor; and the outlet coupled to the cap and a second total dissolved solids sensor, the outlet may deliver a flow from the canister.

In another example, the flow from the canister is modified based on data delivered to a controller from at least one of the first total dissolved solids sensor and the second total dissolved solids sensor. In another example, the canister may include a tube with a first length from the CFValve to the outlet where a concentrate of the flow is determined by the first length. In another example, the CFValve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, the CFValve is configured to maintain a relative constant flow of fluid from a variable pressure fluid supply to a fluid outlet, the CFValve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In another example, the canister may be coupled to a drink dispensing system for one or more cleaning procedures.

As used herein, the term “mobile device” refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system (“PCS”) device, personal digital assistant (“PDA”), personal audio device (“PAD”), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (“ASICs”), digital signal processors (“DSPs”), digital signal processing devices (“DSPDs”), programmable logic devices (“PLDs”), field programmable gate arrays (“FPGAs”), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as “processing,” “computing,” “calculating,” “determining” or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to “one example,” “an example,” “embodiment,” and/or “another example” should be considered to mean that the particular features, structures, or characteristics may be combined in one or more examples. Any combination of any element in this disclosure with any other element in this disclosure is hereby disclosed. For example, an element on page 6 can be combined with any element in this document (e.g., an element from page 20).

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A cleaning system for a drink dispensing device comprising:

a cleaner canister coupled to a water source;

a cleaner CFValve coupled to the water source which provides a first water flow to the cleaner canister, the cleaner canister configured to provide a cleaner solution to one or more parts of the drink dispensing device;

a sanitizer canister coupled to the water source and a sanitizer CFValve coupled to the water source which provides a second water flow to the sanitizer canister, the sanitizer canister configured to provide a sanitizer solution to one or more parts of the drink dispensing device;

a water flush device coupled to the water source and a water flush CFValve coupled to the water source which provides a third water flow to the one or more parts of the drink dispensing device;

a total dissolved solids device which measures an inlet total dissolved solids and an outlet total dissolved solids;

an inlet dry breaking fitting and an outlet dry breaking fitting on the sanitizer canister;

an inlet dry breaking fitting and an outlet dry breaking fitting on the cleaner canister; and a controller that controls one or more ratios based on the inlet total dissolved solids and the outlet total dissolved solids.

2. The cleaning system of claim 1, further comprising the sanitizer canister coupled to the water source and the sanitizer CFValve coupled to the water source which provides a second water flow to the sanitizer canister, the sanitizer canister configured to provide a sanitizer solution to one or more parts of the drink dispensing device.

3. The cleaning system of claim 2, further comprising a water flush device coupled to the water source and a water flush CFValve coupled to the water source which provides a third water flow to the one or more parts of the drink dispensing device.

4. The cleaning system of claim 2, further comprising an inlet dry breaking fitting and an outlet dry breaking fitting on the sanitizer canister.

5. The cleaning system of claim 1, further comprising an inlet dry breaking fitting and an outlet dry breaking fitting on the cleaner canister.

6. The cleaning system of claim 1, further comprising a total dissolved solids device which measures an inlet total dissolved solids and an outlet total dissolved solids.

7. The cleaning system of claim 1, further comprising:

the sanitizer canister coupled to the water source and the sanitizer CFValve coupled to the water source which provides a second water flow to the sanitizer canister, the sanitizer canister configured to provide a sanitizer solution to one or more parts of the drink dispensing device;

a water flush device coupled to the water source and a water flush CFValve coupled to the water source which provides a third water flow to the one or more parts of the drink dispensing device; and a total dissolved solids device which measures an inlet total dissolved solids and an outlet total dissolved solids.

8. The cleaning system of claim 1 wherein one or more of the cleaner CFValve, the sanitizer CFValve, and the water flush CFValve is configured to maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice.

9. The cleaning system of claim 1 wherein one or more of the cleaner CFValve, the sanitizer CFValve, and the water flush CFValve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber;

an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

* * * * *